(12) United States Patent
Edwards et al.

(10) Patent No.: US 12,056,233 B2
(45) Date of Patent: Aug. 6, 2024

(54) RESPONSIBLE PARENT PROCESS IDENTIFICATION

(71) Applicant: McAfee, LLC, San Jose, CA (US)

(72) Inventors: Jonathan L. Edwards, Portland, OR (US); David McCormack, Cork (IE); Leandro Ignacio Costantino, Cabalango (AR); Manish Kumar, Bangalore (IN)

(73) Assignee: McAfee, LLC, San Jose, CA (US)

( * ) Notice: Subject to any disclaimer, the term of this patent is extended or adjusted under 35 U.S.C. 154(b) by 160 days.

(21) Appl. No.: 17/219,493

(22) Filed: Mar. 31, 2021

(65) Prior Publication Data

US 2022/0318377 A1 Oct. 6, 2022

(51) Int. Cl.
*G06F 21/00* (2013.01)
*G06F 21/52* (2013.01)
*G06F 21/55* (2013.01)

(52) U.S. Cl.
CPC ............ *G06F 21/552* (2013.01); *G06F 21/52* (2013.01); *G06F 2221/033* (2013.01)

(58) Field of Classification Search
CPC ... G06F 21/552; G06F 21/52; G06F 2221/033
See application file for complete search history.

(56) References Cited

U.S. PATENT DOCUMENTS

| 8,516,583 | B2* | 8/2013 | Thomas | G06F 21/577 726/23 |
| 2017/0346839 | A1* | 11/2017 | Peppe | H04L 63/1433 |
| 2017/0353345 | A1* | 12/2017 | Grigoryan | H04L 41/0677 |
| 2018/0181750 | A1* | 6/2018 | Lamothe-Brassard | G06F 21/554 |
| 2019/0272375 | A1* | 9/2019 | Chen | G06N 5/045 |
| 2021/0064751 | A1* | 3/2021 | Li | G06F 21/54 |
| 2022/0100857 | A1* | 3/2022 | Filar | G06N 5/01 |

* cited by examiner

*Primary Examiner* — Ghazal B Shehni
(74) *Attorney, Agent, or Firm* — Patent Capital Group

(57) ABSTRACT

There is disclosed in one example a computing apparatus, including: a hardware platform including a processor and a memory; and instructions encoded within the memory to instruct the processor to: trace, for a plurality of actions having different direct parent actors, a common responsible parent actor, wherein the instructions determine that the common responsible parent actor caused or directed the plurality of actions; compile a report of the plurality of actions, wherein the actions are grouped by the common responsible parent actor; send the report to a machine or human analysis agent; responsive to the report, receive from the analysis agent a remedial action; and execute the remedial action.

20 Claims, 23 Drawing Sheets

RESPONSIBLE PARENT PROCESS IDENTIFICATION

FIELD OF THE SPECIFICATION

This application relates in general to computer security, and more particularly though not exclusively, to a system and method for providing responsible parent process identification.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
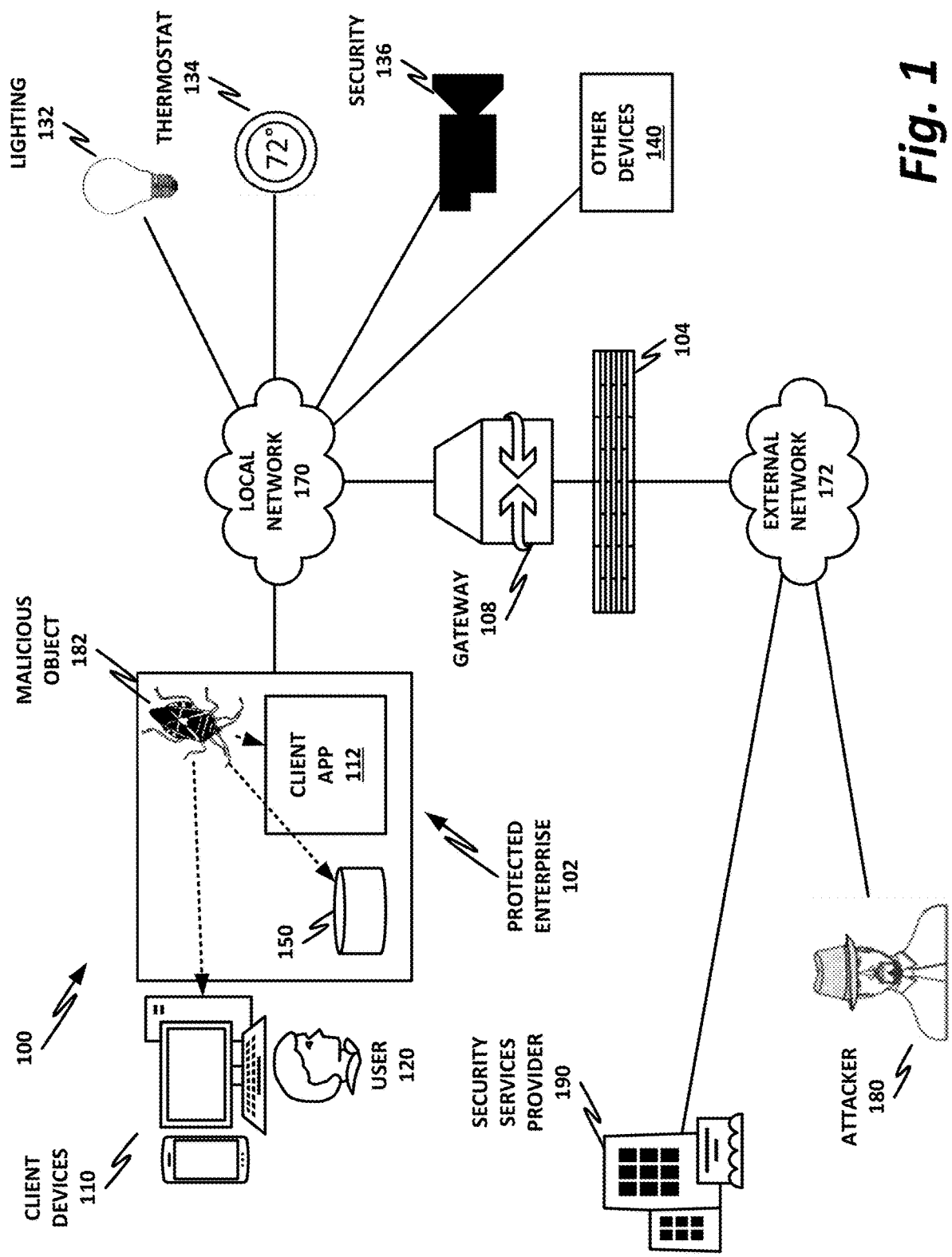
FIG. 1 is a block diagram illustrating selected elements of a security ecosystem.

In an example, there is disclosed a computing apparatus, comprising: a hardware platform comprising a processor and a memory; and instructions encoded within the memory to instruct the processor to: trace, for a plurality of actions having different direct parent actors, a common responsible parent actor, wherein the instructions determine that the common responsible parent actor caused or directed the plurality of actions; compile a report of the plurality of actions, wherein the actions are grouped by the common responsible parent actor; send the report to a machine or human analysis agent; responsive to the report, receive from the analysis agent a remedial action; and execute the remedial action.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Remediation of computer security exploits in the modern environment is more complicated than it was in the days of more basic attacks. First generation computer security software relied on hashes of individual files to identify known malware objects.

Because security engines on both the client side and on server devices have become very effective at identifying and defeating this kind of threat, attackers have developed more sophisticated threats. Instead of a single executable that a user is tricked into running on the machine, malware objects may be delivered via a number of different security vectors, including, by way of illustrative and nonlimiting example, email, web browsers, open ports, security apertures in software, security apertures in operating systems, local area networks (LANs), and removable devices. Instead of installing a single, monolithic executable object that can be readily identified, killed, and scrubbed from the system, more sophisticated malware may take more distributed action.

For example, some attackers have evolved toward fileless and "living off the land" (LoL) attacks. These are attacks that do not install a persistent file, but rather use objects such as registry entries, scheduled processes, command lines, Windows management interface (WMI) objects, and similar to deliver a payload in a distributed manner. The binary that initiates the attack may be referred to as a "LoL binary" ("lolbin" for short), or as a "LoL binary and script" ("lolbas" for short). A feature of a lolbin is that it is already on the computer, for example because it is a standard part of the operating system. Thus, its mere presence is not suspicious, and its actions are generally not considered, per se, to be either malicious or benign.

These fileless and living off the land exploits may use more short-lived processes, and may piggyback on trusted executables to perform their work. For example, the task scheduler is a trusted executable. It is generally not considered practical to simply kill the task scheduler. In many cases, this would completely crash the operating system, or at least prevent it from doing anything useful. Thus, in this type of environment, terminating one process and making sure that it does not automatically run again does not necessarily stop a threat.

To mitigate more distributed threats, the present specification describes a system and method for identifying not just malicious processes, but identifying a "responsible parent," which may be for example a file or process that is ultimately responsible for an action. Responsible parents may have various relationships between processes and configurations, but ultimately may act as "sources of persistency" for LoL-type or similar attacks.

In one illustrative application, identification of responsible parents can be used to group actions that otherwise would appear to be unrelated. For example, some enterprise-class tools are used to identify malicious processes on endpoints. These could include, for example, McAfee's MVISION™ products, or similar products that provide endpoint security. Such products are concerned, inter alia, with "events." Identifying a collection of events can be a useful start to determining if a computer is being attacked, or is being used normally.

In general terms, an "actor" performs an "event" on a "target." The target may be any real or virtual entity, such as a file, a value in a registry, a network address, a process, a service, a database, or an endpoint, by way of illustrative and nonlimiting example. An actor is an active entity, such as a process, a thread, a service, or another computer, by way of example. The "event" may be any verb performed on the target, such as "open," "write," "delete," "create," "terminate," "call," or any other. In this specification, processes are used as an illustrative example of an actor, though any other actor could also be used.

One issue with identifying groups of events is that individual events may not appear to be performed by the same actor, and thus it is difficult to collect them together. However, if multiple processes can be traced back to a common responsible parent, then they can more easily be grouped together. This specification discloses methods for identifying process trees, or otherwise identifying process inheritance, which may be a nontrivial task, as described below. This can be used to group actions together in a meaningful way, or to perform other security actions.

For example, as a simple matter of process inheritance, if a process (e.g., an executable file) is running and is determined to be malicious, then in at least some embodiments, all child processes of that malicious process may be terminated. In this specification, looking for child processes may be referred to as a vertical downward search. Stated otherwise, in the FIGURES, a vertical line downward indicates a child process relationship.

However, there are also vertical, "upward" relationships. For example, if a process is identified as being malicious, it may not be sufficient to look vertically downward and kill all child processes. Rather, it may also be necessary to look vertically upward and terminate the parent processes. However, unlike the vertical downward operation, the vertical upward operation cannot simply terminate every parent process. That approach would ultimately lead to terminating the operating system kernel itself. Although this would result in good theoretical security, it will also result in the computer being useless.

In addition to vertical relationships, there may be indirect parental relationships. These are represented in a process graph as horizontal relationships. Horizontal relationships are created via "nonlinear" relationships. For example, if process A spawns process B, this is a direct, vertical parent-child relationship. But to prevent process B from being identified as malicious when process A is malicious, process A may instead use a nonlinear relationship to spawn process B. For example, process A may rely on certain "autostart" features of modern operating systems to indirectly spawn process B. In one illustrative example, process A creates a WMI action trigger that spawns process B.

In this case, process B will be a direct vertical child—not of process A, but rather of WmiPrvSe.exe. Process A creates this vertical relationship by using a "nonlinear" relationship to manipulate the WMI database. Thus, there is a nonlinear relationship between process A and the WMI database, and this nonlinear relationship is then used to create a horizontal, or indirect, parent-child relationship between process A and process B.

This can provide two benefits to the malware author. If process A is identified as malicious, then process B is not automatically terminated as a direct child of the malicious process. Furthermore, if process B is identified as malicious, process A is not identified as its direct, linear (e.g., vertical) parent. This helps to insulate process A from the identification of process B. A successful identification of process A as a parent of process B requires, instead, examining the nonlinear relationship between process A and the WMI database.

Consider an illustrative example in which a corrupt document exploits a vulnerability in a document viewing application, such as reader.exe or similar. Shell code from the document runs and spawns a PowerShell instance to do more complicated work. In this illustration, the script schedules a task to run periodically. The scheduled script then persists a third script into a WMI action trigger. When the third script runs its actions are detected behaviorally, for example, by a security agent or other malware process running on the machine.

In this illustration, because there are no specific malicious files to identify, much more information may be needed to identify the responsible parent. Simply terminating the third script that was identified as malicious will not effectively mitigate the issue. Furthermore, going vertically up the genealogy of this third script simply leads to the WMI process. As long as WMI itself has not been compromised, it is not a malicious actor, per se. Rather, it is an innocent victim of the attack, and its capabilities have been exploited in a malicious way.

In this illustration, two sources of persistency may be identified, namely the scheduled task and the WMI trigger. Ideally, both of these should be removed. Any persistence involving PowerShell, reader.exe, svchost.exe, the email client, and similar should not be removed. In other words, a properly functioning security agent should not remove the user's email client simply because the email client was used to read a malicious email. However, there is value is identifying and remediating the ultimate responsible parent, or in helping a human security operator to do so.

In one example, the security agent may examine the command line of the PowerShell command to identify "ShippingInvoice.doc" as the source of the malware. If it is not feasible to examine the command line to identify ShippingInvoice.doc as the source of the malware, then a report of the activity should at least include the command line. It may also include the email client to identify that the source of the infected document may have been an email. The system may be configured to identify a particular vertical boundary above which it is not helpful to go. For example, explorer.exe is an ancestor of almost every process in a Windows operating system. Identifying explorer.exe in the vertical genealogy of a malicious process is not helpful for many security contexts.

It should be noted that some processes have two or more parents. For example, the first parent is a parent/child relationship formed when the process creates another process. In the FIGURES of this specification, such a relationship is represented by a solid vertical line. A second species of parentage is a relationship formed when a process communicates with another, causing it to create a process. This communication is represented in the present specification by a nonlinear dotted line, and the indirect parent-child relationship is represented by a horizontal dashed line.

Because of this complicated genealogy, there may not be a clear chain of execution for a process. Working down to up and right to left on a graph, there may be multiple points where a decision needs to be made of what is the "malicious" parent that provides the malicious persistency.

In at least some embodiments, all individual files may be represented as clean. It is, instead, processes and configurations that receive a reputation. Processes may be marked as uninvolved, innocent victims, or malicious.

It should also be noted that when working through a graph horizontally and vertically, there may not be a clear stopping point. For example, if the document reader "reader.exe" was simply performing its function of reading a document, it may be an innocent victim. But even if this is a standard operating system program, if it has been compromised (e.g., if the binary itself has been tampered with or altered), then it may be malicious per se.

According to embodiments of the present specification, at runtime a graph of process relationships may be built and maintained. This graph can include vertical, horizontal, and nonlinear relationships (e.g., nonlinear relationships may be used to create horizontal relationships). The graph can then be used for various security actions. For example, a human security researcher may use the graph to identify suspicious processes that an automated security agent has failed to recognize. In another example, when a detection occurs, the graph may be consulted and the remediation may proceed down the graph to malicious children, across the graph to malicious "siblings," and up the graph to malicious and eventually to nonmalicious parents.

Using this system, indirect parents may be identified, which may be more informative than simply examining direct parentage. In some embodiments, a "root" process is identified as the responsible parent, beyond which there can be no more maliciousness. Some embodiments also include a module to trim the graph so that useful information is retained, but the size remains small.

During normal system operation, a security agent of the present specification collects child-parent relationships, as well as any indirect relationships that it is able to find. Some indirect relationships can only be deduced with hooking, or other high-cost techniques. Thus, in some embodiments, indirect relationships are collected only for "high-risk" or "suspicious" processes that have extra monitoring applied to them. These high-risk processes may be identified using common antivirus or anti-malware techniques.

During runtime, a graph of process relationships may be built. Once the graph is built, or as the graph is being built, the concept of an "interesting" process is used to trim the graph. Branches of the graph consisting only of terminated, uninteresting processes may be removed. This trimming can occur periodically, when a process ends, as the graph is built, or at any combination of the foregoing.

The identification of horizontal parent-child relationships for a process graph via nonlinear relationships may require examining a number of autostart mechanisms within the operating system. The specific autostart mechanisms will depend on the specific operating system, and the version of that operating system. For example, Windows XP and Windows 10, although they are both Windows operating systems, may have very different autostart mechanisms. Similarly, Red Hat Enterprise Linux and Debian Linux may have very different initialization scripts, and are very different from Microsoft Windows or Apple OS X.

By way of illustrative and nonlimiting example, a Windows operating system may include the following autostart mechanisms. By manipulating these autostart mechanisms, a process may create horizontal parent-child relationships.

Examples of autostart locations may include:
Autostart Locations in the Registry. These locations can be used by malware to autostart themselves on the next logon. This is a common persistence technique used by malware, and the parent in this case will be an innocent process and not the malicious process that created the registry entry. Thus, the true parentage may be tracked by an indirect relation between the malicious process and the process started from the autostart entry.
StartupFolders. Any application added to this folder is executed by the innocent explorer.exe logon.
Code Injection. Malicious processes may inject code into an innocent process.
Scheduled Tasks. These can be scheduled, for example, via a WMI event or the task scheduler.
Services. Windows services are launched by the innocent service control manager on behalf of a malicious process.
ForceParent. This is a method in which a process may CreateProcessAsUser. This is a Windows API that may be used to launch a process and make some other unrelated process its parent. This can be used by malware to make an unrelated innocent process the parent, even when the purported parent did not actually launch the malware process.

Embodiments of the security agent described herein monitor these mechanisms to create horizontal or indirect parent-child relationships in a process tree. Note that in some cases, monitoring these processes (e.g., via hooks) is expensive in terms of memory and/or compute resources. Thus, in at least some embodiments, hooks are inserted only for processes that have been identified as suspicious. For example, if an executable is unknown, if it was loaded from a removable drive or a network share, downloaded from the internet, or has been scanned and found to have potential malware attributes, that process may be particularly monitored to look for horizontal relationships.

Using the methods above, various actions can be tied to their responsible parent or parents, thus identifying not just the immediate actor, but also identifying the actor that ultimate instigated the action. In some cases, this could be one or more layers removed from the immediate action.

Notably, certain projects are interested in events. For example, MCAFEE, LLC provides Endpoint Protection Platform (EPP) and Endpoint Detection and Response (EDR). Other vendors provide other products. However, certain individual events are less useful in isolation, where it may be more valuable to see collections of events to decide whether a device is being attacked, or being used abnormally.

As discussed above, conceptually, this can be expressed as an actor performing or causing an event to occur on a target:

Actor→event→target

There is not always a well-defined actor, because some events are reflexive, such as when a Process Terminate event occurs when a process exits naturally after executing its last instruction. In another example, a "Battery Low" even may occur when power reserves fall below a certain threshold.

A target is some real or virtual entity. There are many different types of targets, which may include by way non-limiting example, a file, a value in a registry, a network address, a process, a service, a database, or a physical device.

An event can include any kind of interaction or occurrence, and is typically described with a verb.

One issue is that individual events may not be performed by the same actor. Thus, collecting them together can be difficult, or at least nontrivial. For example, a Windows service can be launched by creating a key in the registry, and then writing several values. Table 1 illustrates a straightforward case:

TABLE 1

Windows Service Launch Via Registry Key Creation

| Actor | Event | Target |
| --- | --- | --- |
| Suspicious.exe | creates | key HKLM\Services\Dodgy |
| Suspicious.exe | writes | value HKLM\Services\Dodgy\ServiceName = "Dodgy" |
| Suspicious.exe | writes | value HKLM\Services\Dodgy\ImageName = "nasty.exe" |
| Suspicious.exe | writes | value HKLM\Services\Dodgy\StartType = 3 |

If a security agent saw those three events, then it can definitively deduce that event "suspicious.exe" creates service "dodgy."

In a more complex case, suspicious.exe may attempt to hide its tracks by using other processes to do its dirty work. In that case, the security agent may see the following events, as illustrated in Table 2:

TABLE 2

Process Capability Exploitation Case

| Actor | Event | Target |
| --- | --- | --- |
| Suspicious.exe | creates | process reg.exe |
| Reg.exe | creates | key HKLM\Services\Dodgy |
| Suspicious.exe | calls | WMI method DefRegProv!WriteValue |
| Wmiprvse.exe | writes | value HKLM\Services\Dodgy\ServiceName = "Dodgy" |
| Suspicious.exe | calls | RPC method CreateScheduledTask |
| TaskSched.exe | creates | process reg.exe |
| Reg.exe | writes | value HKLM\Services\Dodgy\ImageName = "nasty.exe" |

TABLE 2-continued

Process Capability Exploitation Case

| Actor | Event | Target |
| --- | --- | --- |
| Suspicious.exe | creates | process powershell.exe |
| Powershell.exe | creates | process regedit.exe |
| Regedit.exe | writes | value HKLM\Services\Dodgy\StartType = 3 |

In this case, four different processes performed the four interactions with the registry, and each of those four processes were started in a different way. However, those four processes weren't really responsible for their actions. They were under the control of suspicious.exe, and suspicious.exe was using those processes in a way that is harmful to the system. The processes themselves have not been compromised, but rather their capabilities have been exploited to do bad things. It is advantageous for a security agent to report that suspicious.exe created the service, rather than, for example, regedit.exe.

Some existing systems rely on human intelligence to spot relationships between processes, or, in a limited way, to do post-processing on the event tree to understand that relationships exist. Advantageously, embodiments of the present disclosure generate a notification in real time, as illustrated in Table 3, by way of nonlimiting example:

TABLE 3

Real-Time Notification for Event Analysis

| Actor | suspicious.exe |
| Event | created service |
| Target | "Dodgy" |

This can be reported in real time so that the information is immediately available to event analyzers, who can then do useful things with the information.

An operative principle of this specification is that the security agent can be programmed to understand the ways in which processes interact and cause each other to perform actions on their behalf. When an event is generated, it is not only attributed to the immediate actor, but it can also be reattributed to the responsible parent actor. Using an iterative approach to analyzing events, complex chains of actions can be followed, allowing events to be reattributed to a distant responsible parent actor. Thus, before reattribution, it may be said:

TABLE 4

Event Generation Chain

| Before Reattribution: | |
| --- | --- |
| Actor | reg.exe |
| Event | writes to |
| Target | some registry key |
| After Reattribution: | |
| Actor | reg.exe |
| Responsible Actor | suspicious.exe |
| Event | writes to |
| Target | some registry key |

Note that it is useful in some cases to keep the original attribution information so event logs can be correlated with others (e.g., notifications from Windows, notifications from third-party security products, or others).

This disclosure provides a concept of an event having an actor and a responsible actor, such as a responsible parent.

When these two entities are different, the responsible actor may be the more interesting one. This disclosure also provides a method of determining whether an actor is responsible for its own actions, or not. If it is not, then the act may be associated with the responsible actor.

When an event is seen, stored information may be used to determine the final or ultimate responsible actor. This method follows indirect lines of responsibility and parentage to find the interesting actor or processes involved in an attack. This realizes certain advantages over solutions that analyze relationships long after the useful information has been lost. The delay in analysis may mean that other relationships cannot easily be deduced, and detection efficacy may be lowered.

Advantageously, a user interface (UI) can show interesting events emanating from a single point.

Further advantageously, a UI can deemphasize the display of processes that were part of the attack, but only because they were innocent victims.

Further advantageously, false positives may be reduced, because the correct process can be "blamed" for a negative action.

Further advantageously, events can be captured and improved by widely monitoring the real actor.

Further advantageously, the system can correlate low-level events to construct descriptions of high-level behavior.

Further advantageously, components that analyze events do not need to be concerned about process relationships. The important relationships can be distilled out early on in the process.

The foregoing can be used to build or embody several example implementations, according to the teachings of the present specification. Some example implementations are included here as nonlimiting illustrations of these teachings.

There is disclosed in one example a computing apparatus, comprising: a hardware platform comprising a processor and a memory; and instructions encoded within the memory to instruct the processor to: trace, for a plurality of actions having different direct parent actors, a common responsible parent actor, wherein the instructions determine that the common responsible parent actor caused or directed the plurality of actions; compile a report of the plurality of actions, wherein the actions are grouped by the common responsible parent actor; send the report to a machine or human analysis agent; responsive to the report, receive from the analysis agent a remedial action; and execute the remedial action.

There is further disclosed an example computing apparatus, wherein the report further associates the plurality of actions with their direct parent actors.

There is further disclosed an example computing apparatus, wherein the report further associates the plurality of actions with their targets.

There is further disclosed an example computing apparatus, wherein determining that the common responsible parent actor caused or directed the actions comprises determining that the common responsible parent actor is a living off the land binary (lolbin) or a living off the land binary and script (lolbas).

There is further disclosed an example computing apparatus, wherein determining that the common responsible parent actor caused or directed the actions further comprises iteratively examining next-level direct parent actors.

There is further disclosed an example computing apparatus, wherein iteratively examining next-level direct parent actors comprises iterating until a parent is found that is not a lolbin or lolbas.

There is further disclosed an example computing apparatus, wherein iteratively examining next-level direct parent actors comprises iterating until a parent is found that is a well-known process.

There is further disclosed an example computing apparatus, wherein iteratively examining next-level direct parent actors comprises iterating until a parent is found that is a system process.

There is further disclosed an example computing apparatus, wherein determining that the common responsible parent actor caused or directed the actions further comprises iteratively inspecting direct parent actors in a hierarchy until a condition is met.

There is further disclosed an example computing apparatus, wherein the condition is finding an actor that is a well-known or system process.

There is further disclosed an example computing apparatus, wherein a responsible parent actor includes a process that created or changed a system registry value.

There is further disclosed an example computing apparatus, wherein a responsible parent actor includes a process that created or changed a system configuration file.

There is further disclosed an example computing apparatus, wherein a responsible parent actor includes a process that created or changed a system startup script.

There is further disclosed an example computing apparatus, wherein a responsible parent actor includes a process that created or changed a scheduled task.

There is also disclosed an example computing security system, comprising: a computing endpoint, comprising a hardware platform, and operational software to execute on the hardware platform; a security agent configured to protect the operational software, including analyzing a plurality of actions having different direct actors, identifying a common responsible actor for the plurality of actions, and generating a report in which the plurality of actions are grouped by the common responsible actor; and a system analyzer configured to analyze the report, infer an intent of the common responsible actor, and according to the inferred intent, provide a remediation to the computing endpoint.

There is further disclosed an example computing security system, wherein the system analyzer is configured to be augmented by human input or feedback.

There is further disclosed an example computing security system, wherein the system analyzer comprises a machine learning or artificial intelligence system.

There is further disclosed an example computing security system, wherein the system analyzer is configured to receive a pre-trained model.

There is further disclosed an example computing security system, wherein the report further associates the plurality of actions with their direct parent actors.

There is further disclosed an example computing security system, wherein the report further associates the plurality of actions with their targets.

There is further disclosed an example computing security system, wherein determining that the common responsible actor caused or directed the actions comprises determining that the common responsible actor is a living off the land binary (lolbin) or a living off the land binary and script (lolbas).

There is further disclosed an example computing security system, wherein determining that the common responsible actor caused or directed the actions further comprises iteratively examining next-level direct parent actors.

There is further disclosed an example computing security system, wherein iteratively examining next-level direct parent actors comprises iterating until a parent is found that is not a lolbin or lolbas.

There is further disclosed an example computing security system, wherein iteratively examining next-level direct parent actors comprises iterating until a parent is found that is a well-known process.

There is further disclosed an example computing security system, wherein iteratively examining next-level direct parent actors comprises iterating until a parent is found that is a system process.

There is further disclosed an example computing security system, wherein determining that the common responsible actor caused or directed the actions further comprises iteratively inspecting direct parent actors in a hierarchy until a condition is met.

There is further disclosed an example computing security system, wherein the condition is finding an actor that is a well-known or system process.

There is further disclosed an example computing security system, wherein a responsible parent actor includes a process that created or changed a system registry value.

There is further disclosed an example computing security system, wherein a responsible parent actor includes a process that created or changed a system configuration file.

There is further disclosed an example computing security system, wherein a responsible parent actor includes a process that created or changed a system startup script.

There is further disclosed an example computing security system, wherein a responsible parent actor includes a process that created or changed a scheduled task.

There is also disclosed an example of one or more tangible, non-transitory computer-readable storage media having stored thereon executable instructions to: enumerate on a computing system a plurality of actions and targets; identify for the actions responsible parent actors that directed or caused the actions, the responsible parent actors being different from direct actors that directly performed the actions; compile an action report wherein actions are grouped by their responsible parent actors; derive from the action report a remedial security action to remedy a responsible parent actor; and execute the remedial security action.

There is further disclosed an example of one or more tangible, non-transitory computer-readable storage media, wherein the action report further associates the plurality of actions with their direct parent actors.

There is further disclosed an example of one or more tangible, non-transitory computer-readable storage media, wherein the action report further associates the plurality of actions with their targets.

There is further disclosed an example of one or more tangible, non-transitory computer-readable storage media, wherein determining that the responsible parent actor caused or directed the actions comprises determining that the responsible parent actor is a living off the land binary (lolbin) or a living off the land binary and script (lolbas).

There is further disclosed an example of one or more tangible, non-transitory computer-readable storage media, wherein determining that the responsible parent actor caused or directed the actions further comprises iteratively examining next-level direct parent actors.

There is further disclosed an example of one or more tangible, non-transitory computer-readable storage media, wherein iteratively examining next-level direct parent actors comprises iterating until a parent is found that is not a lolbin or lolbas.

There is further disclosed an example of one or more tangible, non-transitory computer-readable storage media, wherein iteratively examining next-level direct parent actors comprises iterating until a parent is found that is a well-known process.

There is further disclosed an example of one or more tangible, non-transitory computer-readable storage media, wherein iteratively examining next-level direct parent actors comprises iterating until a parent is found that is a system process.

There is further disclosed an example of one or more tangible, non-transitory computer-readable storage media, wherein determining that the responsible parent actor caused or directed the actions further comprises iteratively inspecting direct parent actors in a hierarchy until a condition is met.

There is further disclosed an example of one or more tangible, non-transitory computer-readable storage media, wherein the condition is finding an actor that is a well-known or system process.

There is further disclosed an example of one or more tangible, non-transitory computer-readable storage media, wherein a responsible parent actor includes a process that created or changed a system registry value.

There is further disclosed an example of one or more tangible, non-transitory computer-readable storage media, wherein a responsible parent actor includes a process that created or changed a system configuration file.

There is further disclosed an example of one or more tangible, non-transitory computer-readable storage media, wherein a responsible parent actor includes a process that created or changed a system startup script.

There is further disclosed an example of one or more tangible, non-transitory computer-readable storage media, wherein a responsible parent actor includes a process that created or changed a scheduled task.

A system and method for providing multi-lateral process trees for malware remediation will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Security ecosystem 100 may include one or more protected enterprises 102. A single protected enterprise 102 is illustrated here for simplicity, and could be a business enterprise, a government entity, a family, a nonprofit organization, a church, or any other organization that may subscribe to security services provided, for example, by security services provider 190.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the Internet. Local network 170 may also provide access to an external network, such as the Internet, via external network 172. External network 172 may similarly be any suitable type of network.

Local network 170 may connect to the Internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 could be a simple home router, or could be a sophisticated enterprise infrastructure including routers, gateways, firewalls, security services, deep packet inspection, web servers, or other services.

In further embodiments, gateway 108 may be a standalone Internet appliance. Such embodiments are popular in cases in which ecosystem 100 includes a home or small business. In other cases, gateway 108 may run as a virtual machine or in another virtualized manner. In larger enterprises that features service function chaining (SFC) or network function virtualization (NFV), gateway 108 may be include one or more service functions and/or virtualized network functions.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
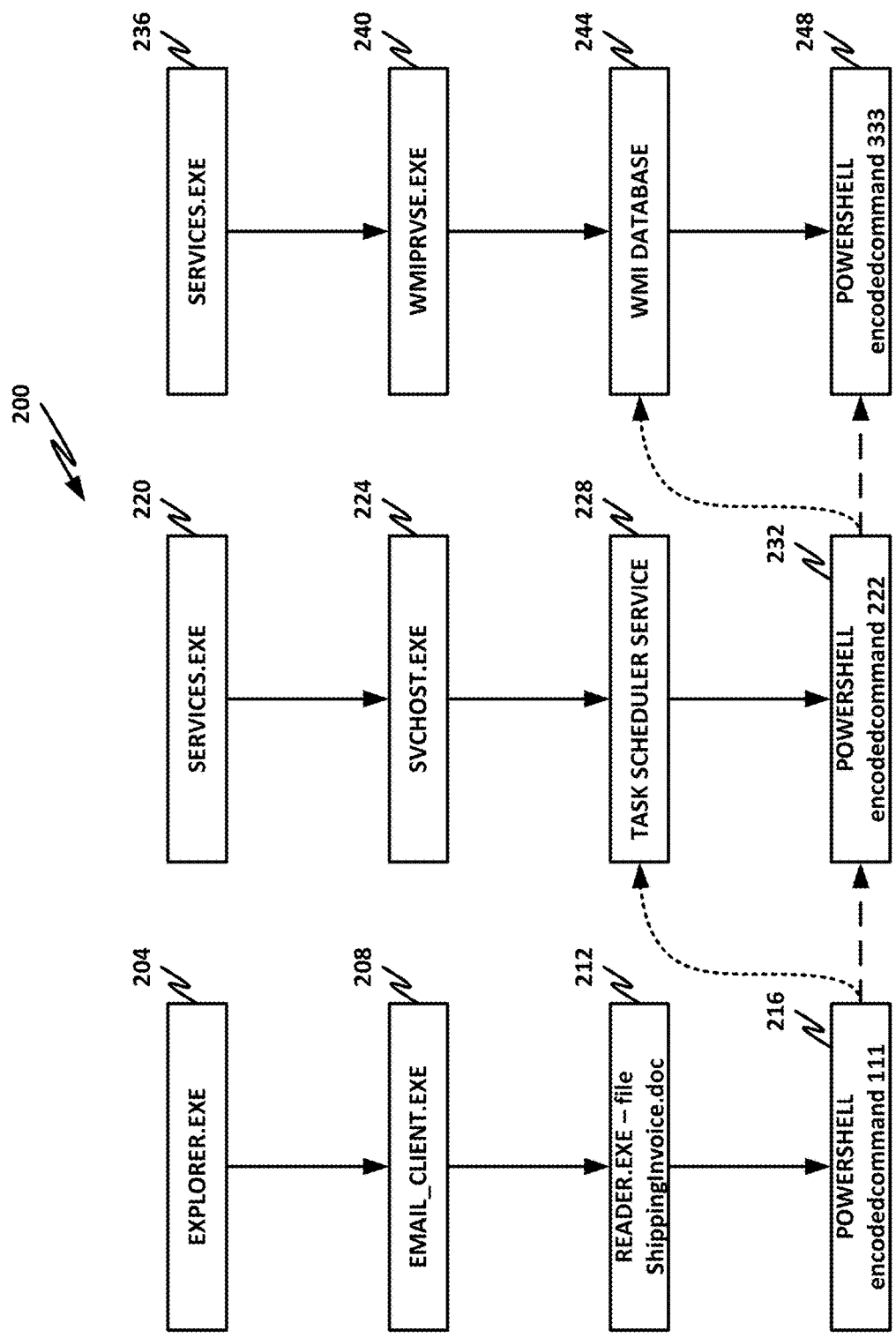
FIG. 2 is a block diagram of a process tree that may be built to help track malicious or possibly malicious activity.

FIG. 2 is a block diagram of a process tree 200. Process tree 200 may be built to help track malicious or possibly malicious activity by an application.

In this illustrative example, Windows applications are used, although this should be understood as a nonlimiting example.

In this example, explorer.exe 204 launches email_client.exe 208. This is a direct parent-child relationship represented by a solid vertical line. Email_client.exe has a reader plug-in that allows a user to read Word documents. Thus, email_client.exe 208 launches reader.exe 212, which reads a static file ShippingInvoice.doc. ShippingInvoice.doc may or may not be malware, but in this example includes active code. To handle ShippingInvoice.doc 212, reader.exe 212 launches an instance of PowerShell 216, with a command such as "PowerShell-encodedcommand JDSJFOS . . . DOISDFJ," where "JDSJFOS . . . DOISDFJ" is a very long string, which PowerShell knows how to decode into a textual powershell script. PowerShell 216 executes encodedcommand 111, wherein encodedcommand 111 represents a command that has been encoded.

From explorer.exe 204 to PowerShell 216, there is a clear descendancy of solid vertical lines following the path 204→208→212→216. However, the descendancy tree does not end here.

Separately, services.exe 220 launches svchost.exe 224. svchost.exe 224 is an innocent and ordinary system process that provides for acknowledged system functionality. Svchost.exe 224 launches a task scheduler service 228 at startup. Although svchost.exe 224 and task scheduler 228 are shown as separate tasks, the distinction is actually less clear. Specifically, in this use case, task scheduler 228 is a dynamic link library (DLL) that is loaded into an instance of the generic svhost.exe 224. The chain from 220→224→228 is an ordinary genealogy for task scheduler service 228. However, there is a nonlinear relationship represented by a nonlinear dotted arrow between 216 and 228. This represents that PowerShell 216 executing encodedcommand 111 manipulates the database for task scheduler service 228. This causes task scheduler service 228 to launch another instance of PowerShell 232. This instance executes encodedcommand 222.

Again separately, services.exe 236 launches an instance of WmiPRvSe.exe 240. The WmiPRvSe.exe 240 launch accesses WMI database 244. In this case, PowerShell 232 has a nonlinear relationship with WMI database 244. For example, PowerShell 232 has inserted a WMI action trigger into WMI database 244. This causes WmiPRvSe.exe 240 to launch PowerShell 248 with encodedcommand 333.

Because PowerShell 216 created PowerShell 232 via a nonlinear transaction with task scheduler service 228, a horizontal dashed line between PowerShell 216 and PowerShell 232 represents an indirect parent-child relationship between the two. Similarly, because PowerShell 232 indirectly created PowerShell 248 via a nonlinear interaction with WmiPRvSe.exe 240, a dashed horizontal line between PowerShell 232 and PowerShell 248 represents an indirect parent-child relationship.

Although this tree may not necessarily represent malicious activity, it could. For example, ShippingInvoice.doc could be a corrupt document that exploits a vulnerability in reader.exe. Shell code within ShippingInvoice.doc runs and spawns a PowerShell instance to do more complicated work (PowerShell 216). This script, PowerShell 216, schedules a task to run periodically. This creates PowerShell 232. PowerShell 232 schedules a persistent third script into WMI database 244 as a WMI action trigger. When this third script (PowerShell 248) runs, its actions may be detected behaviorally. Because there are no specific malicious files within PowerShell 248, more information may be needed to remove the malware and to get an idea of where it came from. A security agent of the present specification can trace back the horizontal relationship between PowerShell 248, PowerShell 232, and PowerShell 216. It may then traverse vertically from PowerShell 216 to reader.exe, and identify that the original source of the malicious activity was ShippingInvoice.doc. However, WMI database 244 and task scheduler service 228 may both be identified as sources of persistency. The entries in these sources of persistency may need to be scrubbed to prevent PowerShell 232 and PowerShell 248 from launching, again. Furthermore, ShippingInvoice.doc 212 should be scrubbed or quarantined. And, naturally, PowerShell 216, PowerShell 232, and PowerShell 248 may be terminated, along with any direct vertical descendants of these processes.

WmiPRvSe.exe 240, task scheduler service 228, and reader.exe 212 may be identified in this instance as innocent victims of the malicious activity. Although they played a role in the malicious activity, they are not themselves necessarily compromised. Rather, they were simply performing their programmed functions. However, it may be desirable to patch security holes that made the attack possible.

Other processes may be identified as uninvolved. This does not mean that they have absolutely no connection to the malicious activity, but that their connection to the malicious activity is at least attenuated enough that they should not reasonably be considered to be involved in the activity. For example, from a security perspective, it is not very "interesting" that PowerShell 248 is ultimately a descendant of explorer.exe 204. The same can be said of virtually all user space processes.

Figure 3:
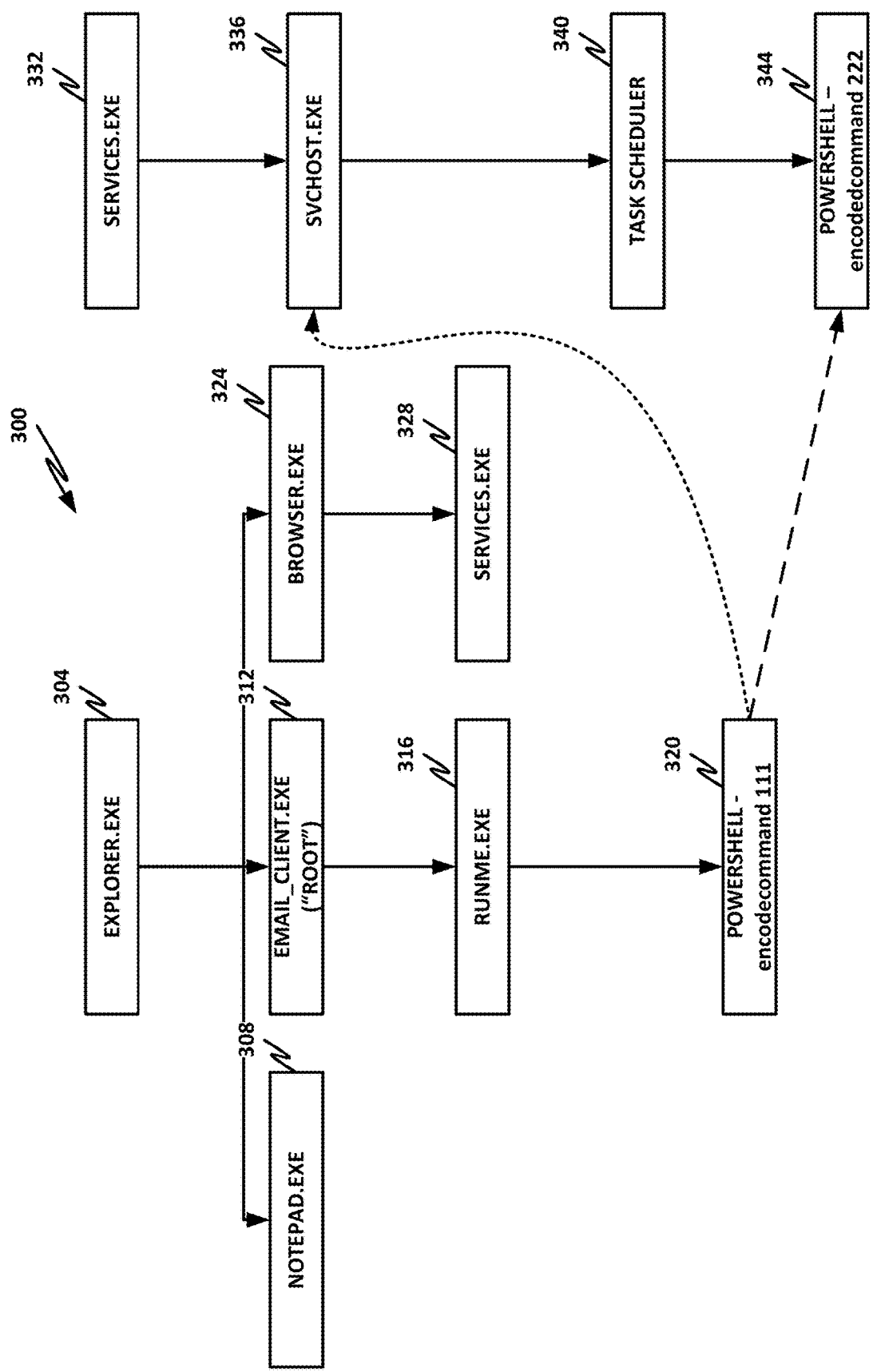
FIG. 3 is a block diagram of a process tree for use in the context of malware detection.

FIG. 3 is a block diagram of a process tree 300. Process tree 300 is disclosed particularly in the context of malware detection. In this example, runme.exe 316 has been identified (either as a file or as a process) as suspicious. Thus, a flag is set for runme.exe 316, as well as for its direct children, including PowerShell 320, and indirect descendants such as PowerShell 344.

In this example, explorer.exe 304 is a direct parent of three processes, namely notepad.exe 308, email_client.exe 312, and browser.exe 324. As discussed above, the fact that explorer.exe 304 is in this tree is not especially interesting from a security standpoint.

Browser.exe 324 is a direct parent of services.exe 328. However, services.exe 328 does not appear to have any connection to any malicious activity. Thus, browser.exe 324 and services.exe 328 may be identified as processes uninvolved with runme.exe 316. Similarly, notepad.exe 308 does not have any descendants, and does not appear to be involved in any malicious activity, and may also be marked as an uninvolved process. On the other hand, email_client.exe 312 is a direct parent of runme.exe 316. Runme.exe 316 is a direct parent of PowerShell 320, and PowerShell 320 has a nonlinear relationship with task scheduler service 340, in which PowerShell 320 has scheduled a task via task scheduler service 340.

Services.exe 332 is a direct parent to svchost.exe 336 and task scheduler 340. These are all known operating system processes, and may not be malicious in themselves. However, task scheduler 340 is a direct parent of PowerShell 344, which may be identified as malicious. PowerShell 344 has an indirect (horizontal) parent-child relationship with PowerShell 320, because PowerShell 320 caused PowerShell 344 to be spawned by task scheduler service 340.

Any one of runme.exe 316, PowerShell 320, or PowerShell 344 may be the one initially identified as a malicious process. If PowerShell 344 is the first identified, then the security agent may walk tree 300 to determine that there is an indirect parent-child relationship between PowerShell 344 and PowerShell 320. The security agent may also determine that PowerShell 320 is a direct descendant of runme.exe 316.

This may start a deep remediation of runme.exe, which ultimately will encompass all three of runme.exe 316, PowerShell 320, and PowerShell 344.

Whichever process is first identified, or however it is identified, the security agent may examine the graph beyond the point of detection. When identifying a set of processes to remediate, the security agent may start at the detected process and follow the tree downwards, following all direct and indirect links out of a process. In at least some examples, all direct children of the identified malicious process are automatically terminated, and all indirect children may also be terminated. By indirect children, it should be understood to be those that have a horizontal relationship in the graph. Nonlinear relationships (such as the relationship between PowerShell 320 and task scheduler service 340) do not necessarily imply the need for a termination. Task scheduler service 340 in this case may be considered an innocent victim of PowerShell 320, and is not malicious in itself. However, because PowerShell 320 caused PowerShell 344 to be spawned, this is an indirect parent-child relationship (horizontal) and therefore should be terminated.

Process tree 300 may also be followed in an upward direction, following both direct and indirect links. More judgment may be required in following indirect links upward. For example, PowerShell 344 spawned from task scheduler service 340, but task scheduler service 340 may be allow listed as a system service that should not be terminated. An allow list is used here to illustrate that task scheduler service 340 is a well-known service that can easily be allow listed, but allow listing should not be understood to be the only method for finding the appropriate termination boundary for traversing a graph upward.

In this case, PowerShell 320 is a direct descendant of runme.exe 316, and runme.exe 316 is not trusted. Furthermore, analysis may have indicated that runme.exe 316 is actually malicious.

Email_client.exe 312 may not necessarily be included on an allow list of system services that should never be terminated, but may have a sufficiently high reputation to draw a security boundary between runme.exe 316 and email_client.exe 312. When following the graph upward, the stopping point is a process that is determined to not be under the control of the suspected process. This may be identified as the "root" process, and requires knowledge of how the operating system works. For example, some of the rules for Microsoft Windows include:

The parent process of all services is services.exe (running as system).

The parent process of all of a user's processes is "winlogon.exe."

The shell (normally explorer.exe) is a child of winlogon.exe, and is a parent to all or most processes launched by the user.

Other rules may be used to determine a root process for a Microsoft Windows operating system, or other operating systems.

Figure 4:
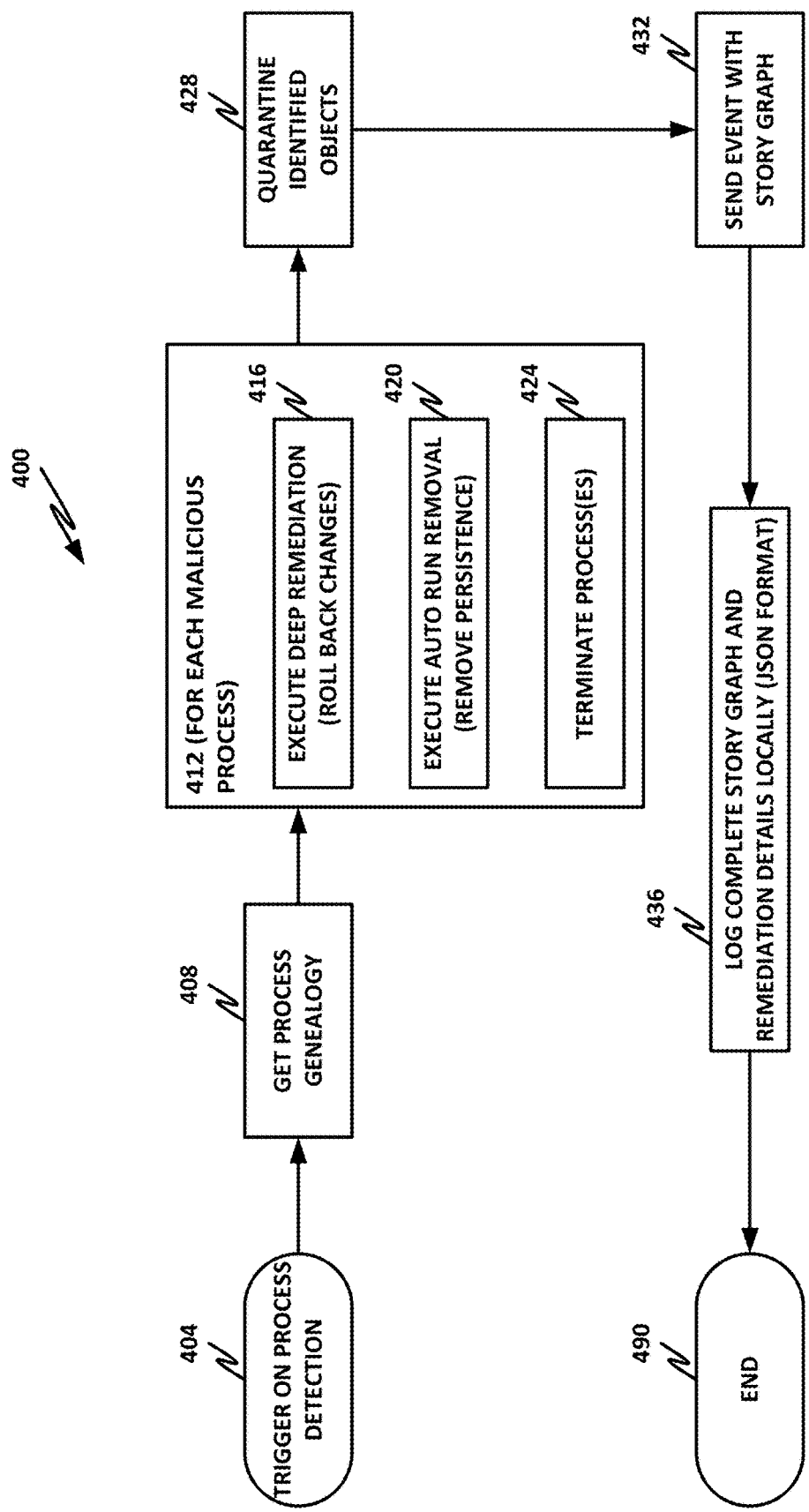
FIG. 4 is a workflow diagram illustrating a workflow for malware remediation.

FIG. 4 is a workflow diagram 400. This illustrates a workflow for performing malware remediation according to the teachings of the present specification. Workflow 400 may be performed, for example, by a security engine running on a client device.

An objective of workflow 400 is to facilitate behavioral analysis by allowing unknown malware to execute in a controlled way to increase the likelihood of detecting its characteristics. It also helps to protect and correct the endpoint from damage inflicted by the malware while its behavior is being analyzed. Furthermore, it permits new (innocent) software to run without undue delay or prevention by the security agent. This can be accomplished by tracking and recording changes made by the suspected malware to the file, directory, registry, and other locations. This enables the system to undo the effects and restore the endpoint to its original state if the suspected file is found to indeed be malware.

The security agent may also provide enhanced remediation to bring in superior remediation capabilities by utilizing various techniques. These include, by way of illustrative and nonlimiting example:

Deep Remediation—Monitors and backs up all the disk activities of a monitored process, so that it can roll back any changes to the original state when remediated.

Process Genealogies—Monitors process creation and termination events in the system, establishes relationships (direct parent-child and indirect parent-child) between processes when detected, and identifies critical processes and root processes in the process chain.

AutoRun removal—Looks up possible locations that malware may use to persist after a breach, including but not limited to the AutoRun registry entries, shortcuts, startup entries, Windows services, scheduled tasks, WMI triggers, and others.

Enhanced remediation can, in some cases, be provided in different modes. In full monitoring mode, the security agent uses local disk space to store the modifications done by the unknown process until detection (time boxed). It then rolls back all changes (e.g., files, registry entries, services, scheduled tasks) made by the monitored process and releases disk space.

An alternative operational mode is partial monitoring mode, which in some cases may be used to monitor newly created files only. In some embodiments, this is the default mode. In partial monitoring mode, the security agent tracks only newly created files by the malware, and thus is not able to roll back all changes. This mode is useful in cases where disk space is at a premium, or is a concern.

Enhanced remediation workflow 400 triggers in block 404 on process detection. In other words, the system may detect a new process, either because it has newly spawned, or because it first appears after being downloaded, copied from a network location or a removable disk, or by some other action.

In block 408, the security agent gets the process genealogy. Getting the process genealogy may include examining and/or truncating a process tree, which may have been built as the process was executing.

Once the process tree and the full process genealogy have been revealed, in some embodiments, a number of operations 412 are performed for each process in the process genealogy. These can include, in block 416, executing a deep remediation, which rolls back changes. In block 420, the system may also execute an AutoRun removal process which removes persistence. In block 424, the system may terminate the process or processes, including processes that have horizontal and/or vertical relationships to the malicious process, up to a root process that is not terminated. Identification of a root process is discussed more particularly in connection with FIG. 3.

In block 428, the security agent quarantines all identified objects. In block 432, the security agent may send an event with a story graph to a policy engine of an enterprise or global security server. This policy engine can then watch for similar malware on other systems within the enterprise or globally.

In block 436, the security agent logs a complete story graph and remediation details locally. In one example, the story graph and remediation details are provided in a JavaScript Object Notation (JSON) format.

In block 490, the workflow ends.

One consideration for workflow 400 is when to trigger process detection in block 404. Triggering for monitoring may occur on various different events. For example, if a process is identified as having a reputation less than or equal to a threshold (e.g., an unknown or negative reputation) then enhanced remediation may be triggered. In security services provided by MCAFEE, LLC, a reputation of 50 is "unknown," and other reputation services may use other reputation scales.

Monitoring may also be triggered when a process reputation changes and drops below the threshold, for example, due to dynamic link library (DLL) orchestration or injection. Enhanced remediation could also be triggered when a reputation override from an enterprise security server forces the reputation to a value less than or equal to the threshold.

In some cases, events may also be used to trigger a cessation of monitoring of the process. For example, in some embodiments the system may stop monitoring after 10 minutes if there are no detections of malicious activity.

In some embodiments, workflow 400 may include a concept of sessions. Sessions may include monitored processes and all spawned processes from the monitored process. Sessions can include active sessions, terminated sessions, and archived sessions. If there are no detections, then unmonitored sessions may be moved to terminated sessions for disk cleanup and archiving.

In some embodiments, special storage regions may be allocated on a drive and be protected to store session information. Terminated sessions may be purged at regular intervals (e.g., 10 minutes) to keep usage within a threshold, such as within 5 percent of overall disk space of the drive.

Figure 5:
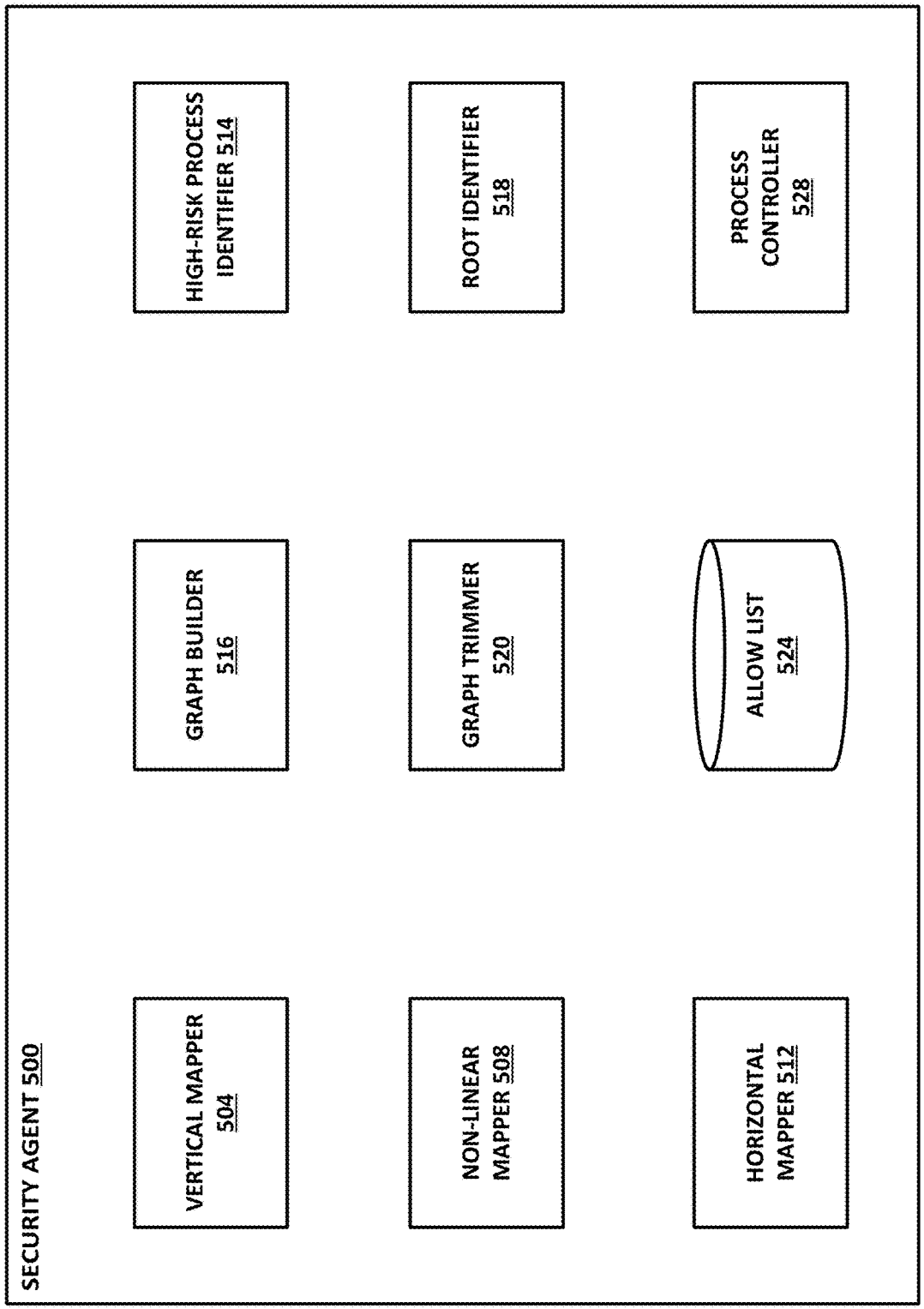
FIG. 5 is a block diagram of selected elements of a security agent.

FIG. 5 is a block diagram of selected elements of a security agent 500. There is disclosed herein a security agent 500 with a number of modules, wherein each module may be a discrete element. However, this should not be understood as a limiting example. For example, the modules may be hardware modules, software modules, firmware modules, or any combination thereof. Furthermore, while the various operations are disclosed herein as discrete modules, it should be understood that a particular function or method could span one or more modules, while in other cases a single module could perform more than one function. Thus, the block diagram of security agent 500 should be understood to be essentially functional in nature, and to illustrate the various functions that may be performed by security agent 500, rather than requiring any specific hardware, software, and/or security or firmware configuration.

Security agent 500 includes a vertical mapper 504. Vertical mapper 504 includes logic to map vertical or direct parent-child relationships between processes. In some cases, this is a nearly trivial task, and may even be provided by the operating system, which provides its own mappings of direct process genealogy. Thus, in at least one embodiment, a vertical mapper may be configured simply to query the operating system for the vertical mappings.

Security agent 500 also includes a nonlinear mapper 508, which may be configured to map or trace nonlinear relationships. This is illustrated, for example, in FIG. 3 wherein PowerShell 320 manipulates a database or list for task scheduler service 340, to cause task scheduler service 340 to launch a process.

Nonlinear mappings may be used to derive horizontal mappings within horizontal mapper 512. Horizontal mapper 512 may include logic to infer horizontal or indirect parent-child relationships, such as the relationship between PowerShell 320 and PowerShell 344 in FIG. 3. This kind of horizontal relationship indicates that one object is an indirect child of an object, or in other words, that the second object was caused to be spawned by the first object, even though the first object is not the direct parent of the second object.

A graph builder 516 may be used to construct a process graph similar to process graph 200 of FIG. 2 and process graph 300 of FIG. 3.

As part of graph builder 516, there may be a root identifier 518, which is configured to identify a root process above which remediation is not necessary. For example, in FIG. 3, email_client.exe 312 is identified as the root process. Email_client.exe 312 is not, itself, compromised, and is not malicious, but rather is a victim of malicious activity by runme.exe 316. Generally, as remediation occurs, when the graph is traversed vertically, processes including and above the root process are not terminated or remedied.

A graph trimmer 520 may also be provided to trim the graph, such as by removing information that is deemed not useful in a security context. For example, in FIG. 3, explorer.exe 304 is identified as a parent to a number of processes. But because explorer.exe 304 is a nearly ubiquitous parent to user launched processes, it is not interesting from a security perspective that explorer.exe appears as a parent to multiple processes.

Security agent 500 may also include an allow list 524. Allow list 524 may include a list of known processes, such as operating system processes, that are deemed trustworthy and should not be designated as malicious. Allow listed processes generally should appear at or above the root process in a process graph.

A process controller 528 may have low-level access to the system, or to system services. This allows process controller 528 to insert hooks into other processes, or to perform other low-level operations, such as disk access, as well as access to events, triggers, schedules, databases, and other resources that enable process controller 528 to take action over other processes. This makes process controller 528 suitable for performing the remedial operations of security agent 500. Depending on the operating mode, the remedial actions may be full or partial, but in either case may involve rolling back some or all of the work done by the identified malware process. Furthermore, process controller 528 enables security agent 500 to perform some of the graphing functions of graph builder 516, and in particular some of the horizontal and nonlinear mapping functions.

A high-risk process identifier 514 may include logic for identifying high-risk processes. Some techniques for identifying high-risk processes, including triggering identification, are discussed in connection with FIG. 4, above, and elsewhere throughout this specification. In some embodiments, high-risk process identifier 514 may use conventional malware logic to identify high-risk processes, or may interface with a customary antivirus or anti-malware engine to identify suspicious processes. Processes that are identified as suspicious may be subjected to enhanced security screening.

Figure 6:
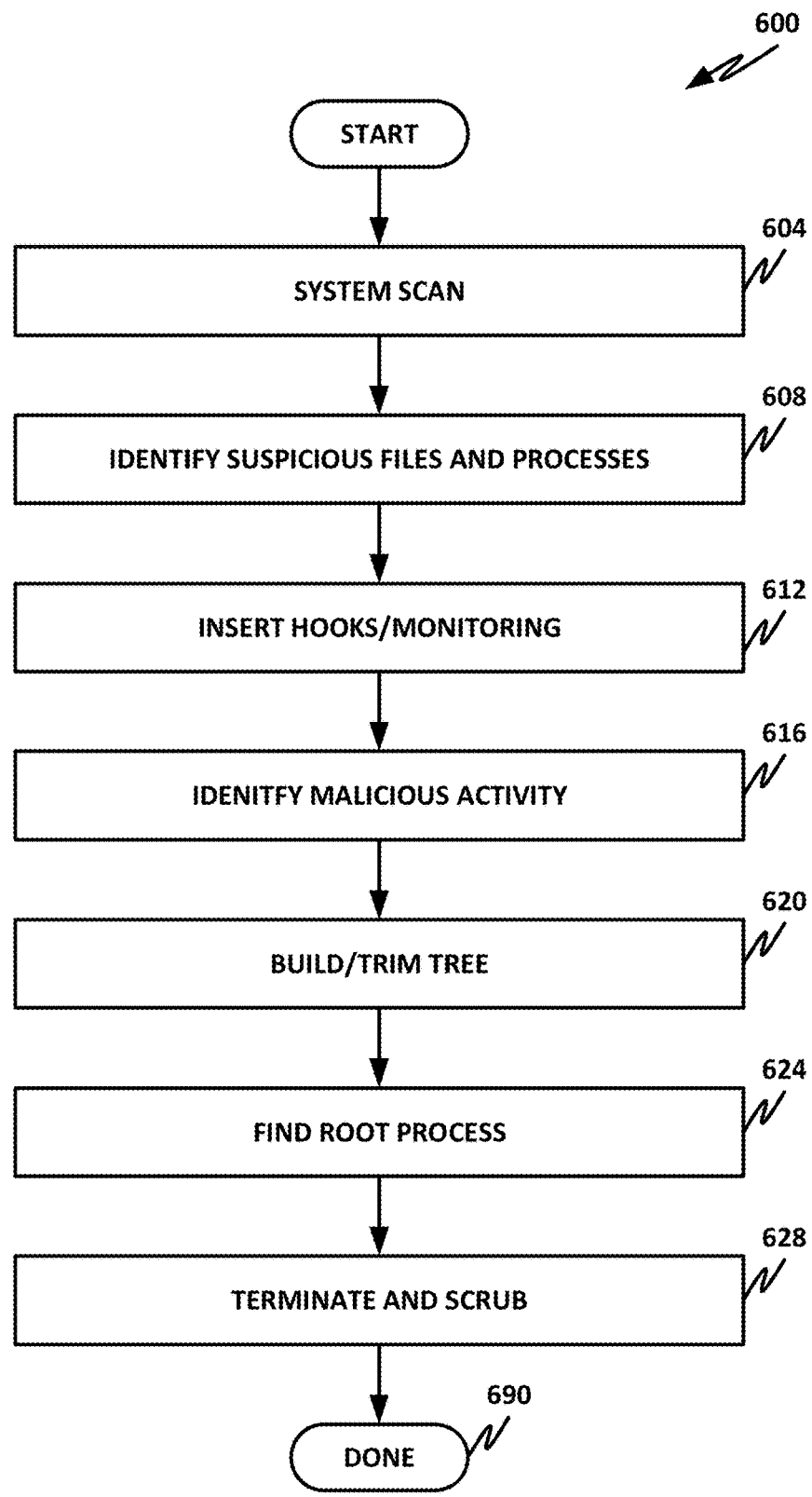
FIG. 6 is a flowchart of a method that may be performed in whole or in part by a security agent.

FIG. 6 is a flowchart of a method 600. Method 600 may be performed in whole or in part by a security agent as described in the present specification. Method 600 is illustrated as a flow of sequential elements from element 604 to element 690. This illustration of these elements is not intended to imply that the operations must be performed in this particular sequence, nor is it intended to necessarily imply a specific cause-and-effect relationship between certain elements.

Starting in block 604, the security agent initializes a security scan. This security scan could be triggered on system startup, on another event, scheduled periodically, or otherwise performed at a given time. In other embodiments, a full system scan is not required, but scanning of a particular object or group of objects may be triggered on some other event. For example, when a file is newly added or opened on the operating system, this may trigger scanning of that particular file.

In block 608, the security agent may identify from the scan one or more objects (including processes and/or files), that are deemed suspicious. For example, these may be objects that do not have a known reputation, or that have a known reputation but do not meet a particular threshold, such as in the example where a threshold is less than or equal to 50.

In block 612, for each of these suspicious processes, the security agent inserts hooks, or subjects the processes to other monitoring. The hooks may be used to help a mapping module to build a process tree or process graph of the relationships between the original process and other processes on the operating system. This can include hooks that enable the building of nonlinear and horizontal (indirect) parent-child relationships.

In block 616, the security agent identifies malicious activity within one or more monitored processes. As discussed in connection with high-risk process identifier 514 of FIG. 5, identification of malicious activity may in some embodiments be based on existing or known malware identification techniques. In particular, this can include behavioral or heuristic analysis that identifies malicious or suspicious behavior.

In block 620 the security agent builds, or loads, the process tree or process graph. Note that in some embodiments, building the process graph is a continuous process that occurs as the process is executing. In other embodiments, the graph is built as-needed, at the time of analysis. In block 620, the security agent may also trim the process graph as necessary. For example, referring to FIG. 3, in process graph 300 the security agent may trim explorer.exe 304 from the tree, because the fact that a process is a child of explorer.exe 304 may not be interesting in the present context as a security indicator. Furthermore, there are branches starting from notepad.exe 308 (which have no children) and browser.exe 324 (which has no malicious child activity) that can also be trimmed from the tree, because they do not appear to provide any counting can also become because they do not appear to provide any additional security context to the tree.

In block 624, the security agent traverses the process tree both horizontally and vertically, looking for malicious activity. Any direct, vertical descendants of the identified malicious process may be automatically terminated, as may any immediate horizontal relationships, and any of their vertical descendants. However, identifying vertical ancestors for termination may be a nontrivial process. For example, if malicious activity is detected in PowerShell 320 of process graph 300 of FIG. 3, then a decision needs to be made where to terminate upward, vertically. In this case, a root identifier identifies email_client.exe 312 as the known good root process, and establishes a security boundary between email_client.exe 312 and runme.exe 316. Below the established security boundary, processes may be marked both vertically and horizontally for termination, while above the security boundary, the root process and any of its parent processes are not marked for termination.

In block 628, the security agent carries out the terminations, and performs other scrubbing or remedial action that may be needed to roll back the effects of the malicious process. As discussed above, this may include a full or a partial roll back, depending on the operating mode.

In block 690, the method is done.

Figure 7:
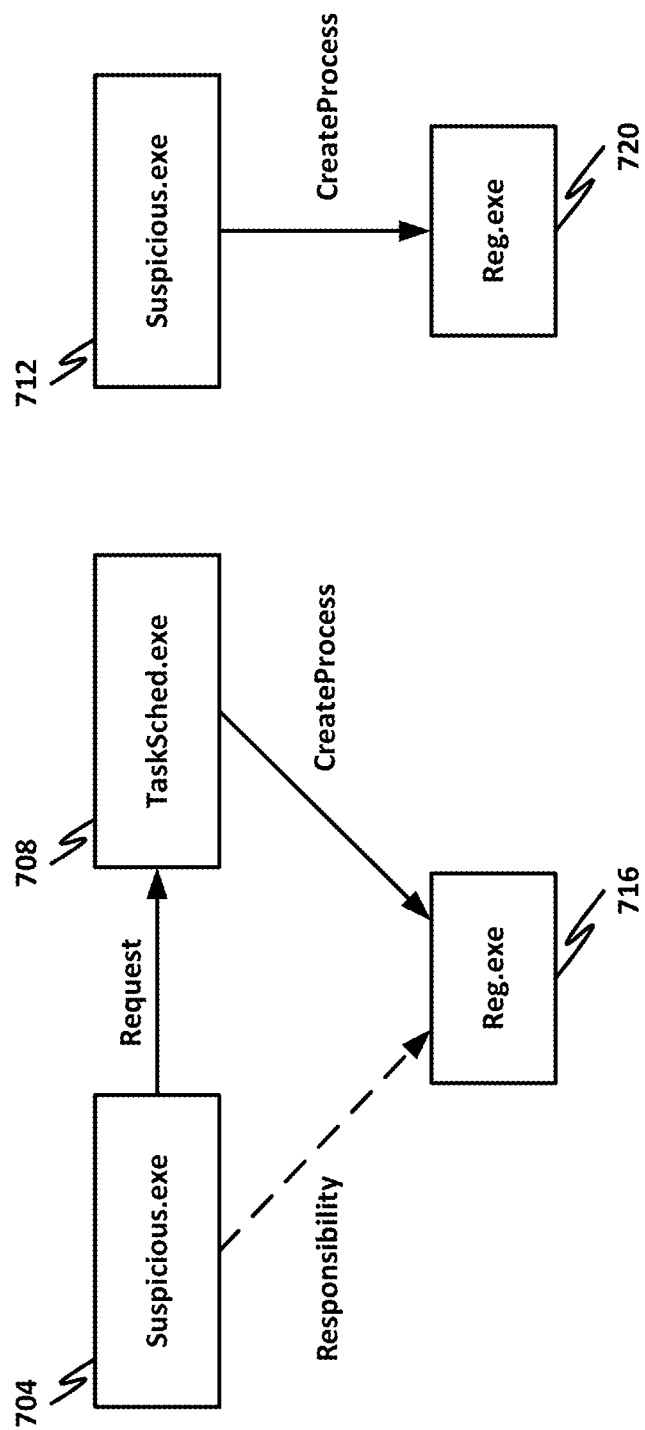
FIG. 7 is a block diagram of a process hierarchy.

FIG. 7 is a block diagram of a process hierarchy. Methods of indirect process creation are known, and may be monitored by a security agent of the present specification. Each process has a parent, namely the process that created it. In this specification, a "responsible parent" is the most interesting process that caused a process to be created.

Generally, a process is "interesting" if it is not a standard system utility. More specifically, the lolbin file itself is not "interesting," but processes created from these files can be interesting, especially when the parent (real or responsible) is interesting. Thus, it is less beneficial to trace a process genealogy all the way back, for example, to the kernel, or to "explorer.exe" in Microsoft Windows. Those processes are not "interesting," because they are unlikely to be malicious, and are unlikely to be the ultimate source of a problem with the system. The source would be a deliberately constructed binary object that is causing useful work to be done.

In FIG. 7, there are illustrated two means by which a process called "suspicious.exe" could create a registry entry.

In the first illustration, suspicious.exe 712 directly created or spawned reg.exe 720. Thus, suspicious.exe 712 is the direct parent of reg.exe 720, and is also the responsible parent for the process reg.exe, and any work done by reg.exe 720.

On the left, there is shown a less straightforward embodiment. In this case, suspicious.exe 704 requested tasksched.exe 708 to create reg.exe 716 at some time in the future. When the future time was reached, tasksched.exe 708 created the process reg.exe 716, and caused it to perform some work.

In this case, tasksched.exe 708 created reg.exe 716 in response to a request. So, while tasksched.exe 708 is the direct lineal parent of reg.exe 716, suspicious.exe 704 is the actual responsible parent, meaning that it is the most "interesting" parent of reg.exe 716.

Advantageously, this disclosure extends the idea of responsibility to all events, not just to process creation. Four examples are provided here, by way of illustration.

The first example is called a "green" event:

TABLE 5

Example Green Event

| Actor | Event | Target |
|---|---|---|
| Suspicious.exe | creates process | reg.exe |
| Reg.exe | creates | key HKLM\Services\Dodgy |

This event is based on "lolbin" recognition. Note that lolbin and "lolbas" are industry standard terms. "LoL" is short for "living off the land." "Bin" is short for "binary," thus, a lolbin is a "living off the land binary." "BAS" is short for "binary and script," thus, lolbas is "living off the land binary and script." A lolbin or a lolbas may be a program or script that is already on the target computer. The attacker can immediately use it without needing to download more tools.

Embodiments of the present specification include a security agent that incorporates an updatable database of known lolbins, and the actions for which they can be used. When process creation is seen, the security agent may identify reg.exe as a lolbin. It is part of Windows and may write to the registry, based upon the command line with which it was launched.

Note that the process-create is an event. This event may be attributed and be the information that causes the reattribution of future events by the child process. These two decisions may be independent. In this example, the second case is of interest.

Similarly, a registry write event may be reattributed and be the information that causes the reattribution of future events somewhere else in the system. Again, these two decisions may be independent. For purposes of this discussion, the first case is of interest.

Figure 8:
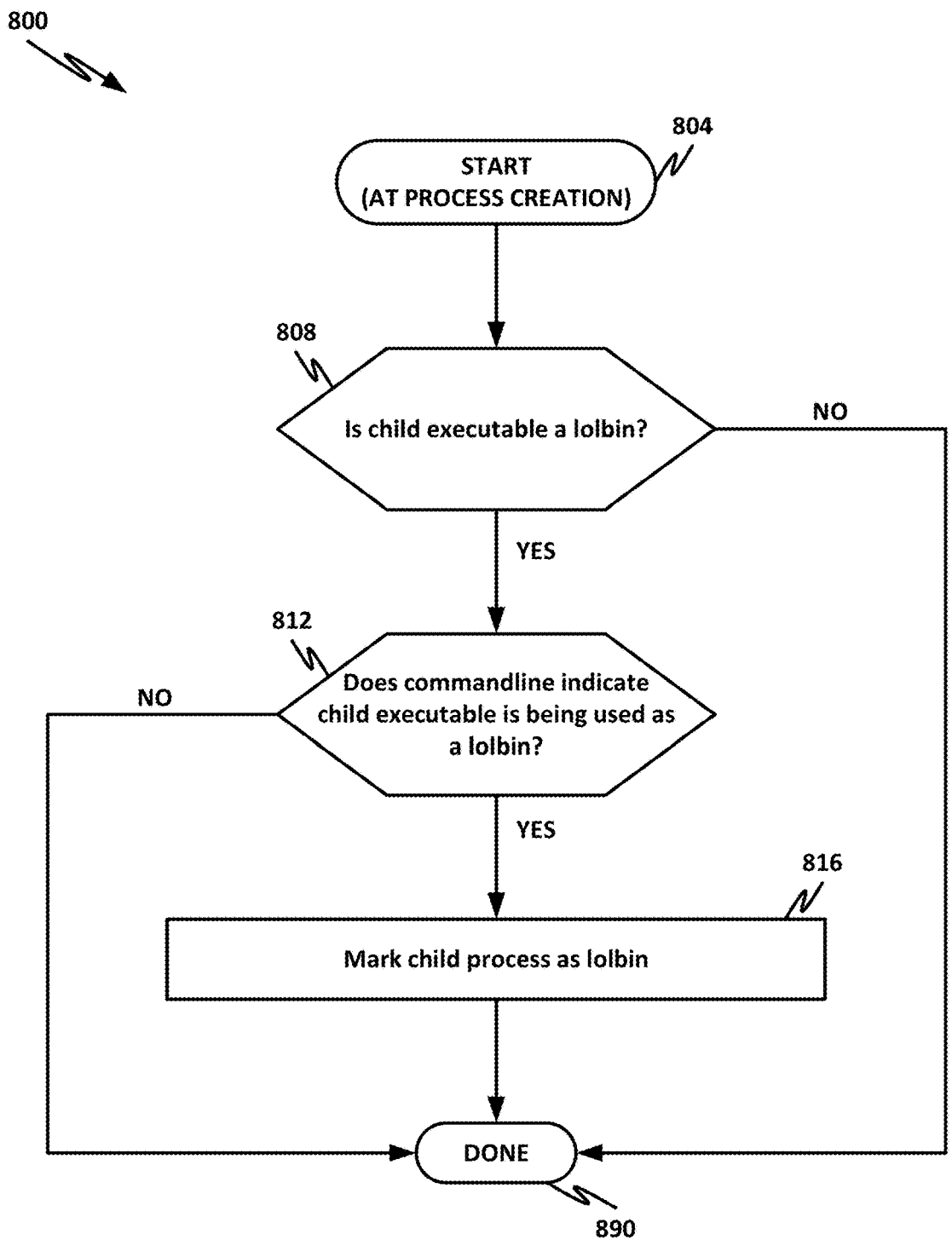
FIG. 8 is a flowchart of a method.

FIG. 8 is a flowchart of a method 800. Method 800 may be used by the security agent to identify lolbins.

Starting in block 804, the method launches at process creation.

In block 808, the system determines whether the executable is a lolbin. For example, in the previous example, reg.exe is a lolbin.

If the executable is a lolbin, then in decision block 812, the system determines whether the command line indicates that it is being used as a lolbin.

If it is, then in block 816, the child process is marked as a lolbin.

In 890, the method is done.

Figure 9:
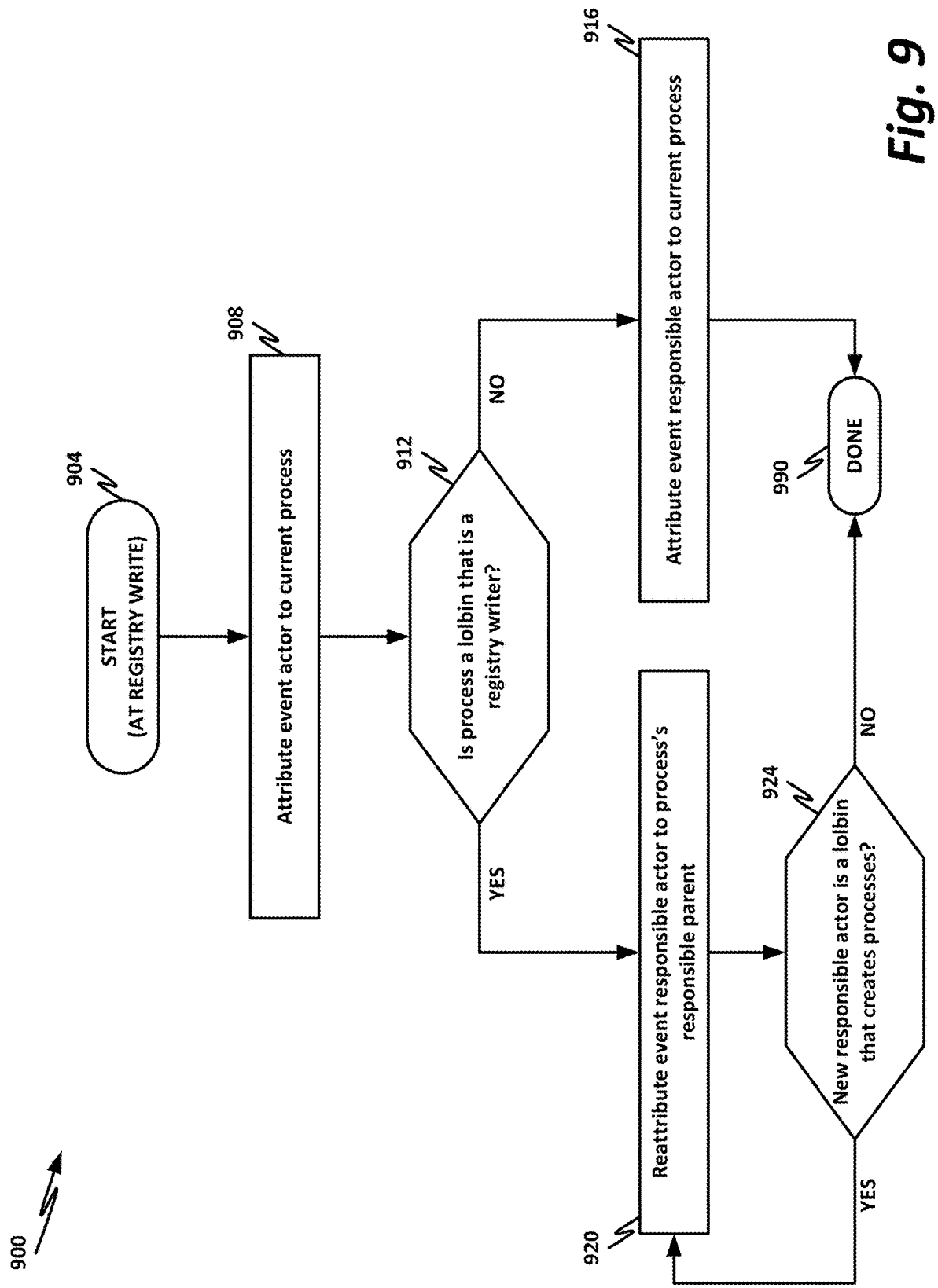
FIG. 9 is a flowchart of a method performed at registry write.

FIG. 9 is a flowchart of a method 900 performed at registry write.

Starting in block 904, a registry write is the stimulus for beginning the method.

In decision block 908, the system assigns the current process as the event actor.

In decision block 912, the system determines whether the process is a lolbin that is a registry writer.

If the process is not a lolbin that is a registry writer, then in block 916, the process is attributed as the responsible actor for the event.

Returning to decision block 912, if the process is a lolbin that is a registry writer, then in block 920, the system may reattribute the process's responsible parent as the event responsible actor or responsible parent.

In decision block 924, the system determines whether the responsible actor is a lolbin that creates processes.

If so, the system loops back to block 920. If it is not, then control passes to block 990.

In block 990, the method is done.

Note that in at least some embodiments, the command line to reg.exe need not be analyzed to "guess" what it might do. Rather, the system may wait and see what it really does, and then reattribute as necessary. For reg.exe, it is feasible to analyze and guess, but for other lolbins, it may not be feasible. Thus, the "wait and reattribute" approach is more general and reliable.

For the second event:

TABLE 6

Receiving Thread Under Control of RPC Initiator

| Actor | Event | Target |
|---|---|---|
| Suspicious.exe | calls | WMI method DefRegProvlWriteValue |
| Wmiprvse.exe | writes | value HKLM\Services\Dodgy\ ServiceName = "Dodgy" |

The WMI service isn't a lolbin, but rather is a service with a well-defined API, with which processes can ask it to do things. Therefore, the system also tracks remote procedure calls (RPCs) between processes.

When the RPC message behind "ask WMI to write a registry value" is seen, the receiving thread may be marked as being under the control of the process that initiated the RPC call. When WMI is seen writing to the registry, the writing thread can be checked to see if it is currently the recipient of an RPC call.

Figure 10:
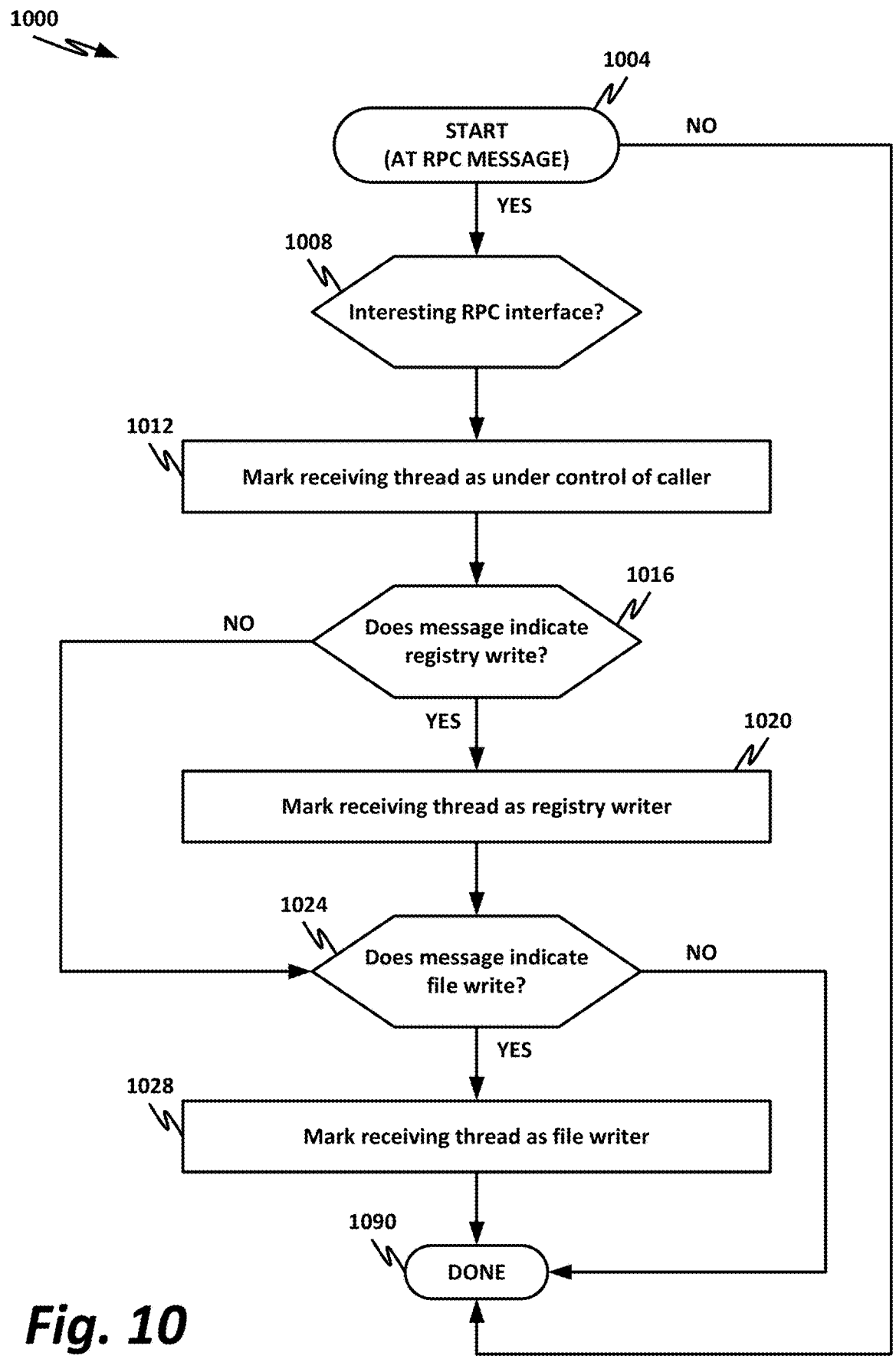
FIG. 10 is a flowchart of method that is performed upon a remote procedure call (RPC) message.

FIG. 10 is a flowchart of method 1000 that is performed upon an RPC message.

FIG. 10 is a flowchart of method 1000 that is performed upon an RPC message.

In block 1004, the stimulus for starting the method is an RPC message.

In block 1008, the system checks whether there is an "interesting" RPC interface. If there is not, then there is nothing to do, and the method is done.

Returning to decision block 1008, if there is an interesting RPC interface, then in block 1012, the system may mark the receiving thread as being under the control of the caller.

In decision block 1016, the system checks whether the message indicates a registry write. If it does not, then control passes to block 1024.

If the message indicates a registry write, then in block 1020, the system marks the receiving thread as a registry writer.

In decision block 1024, the system checks whether the message indicates a file write. If not, there is nothing else to do, and the method is done.

If there is a file write, then in block 1028, the system may mark the receiving thread as the file writer.

In block 1090, the method is done.

Figure 11:
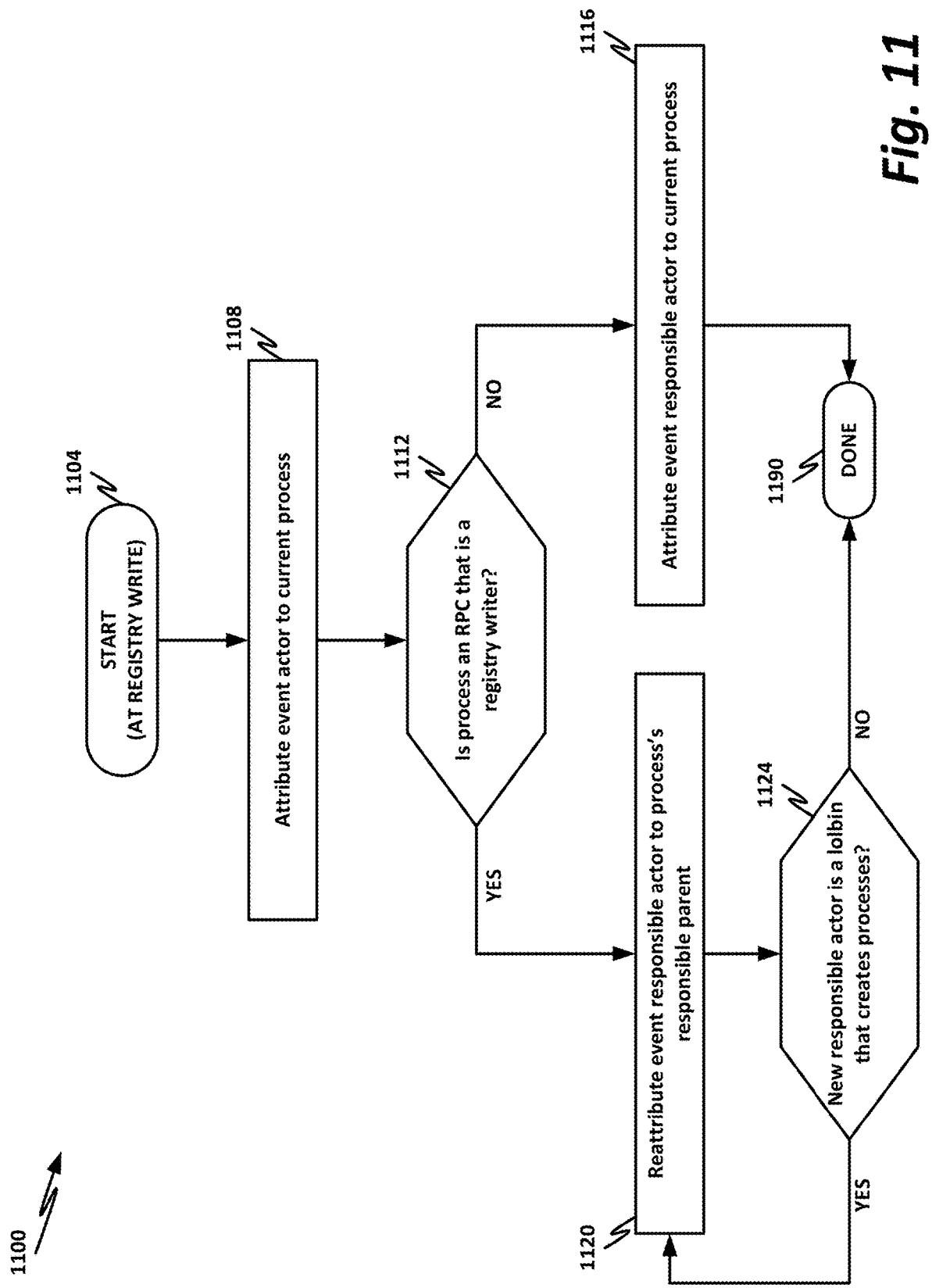
FIG. 11 is a flowchart of an additional method.

FIG. 11 is a flowchart of a method 1100. Method 1100 is performed upon the registry write in the example above.

Starting in block 1104, the registry write is the stimulus for starting the method.

In block 1108, the current process is attributed as the event actor.

In decision block 1112, the system determines whether there is a thread in an RPC that is a registry writer.

If there is not, then in block 1116, the system attributes the current process as the event responsible actor.

Returning to decision block 1112, if there is a thread in an RPC that is a registry writer, then in block 1120, the system reattributes the process's responsible parent as the event responsible actor.

In block 1124, the system checks whether the new responsible actor is a lolbin that creates processes. If it is, then control returns back to block 1120.

Once the responsible actor lolbins have been exhausted, in block 1190, the method is done.

Next, the third and fourth events can be analyzed.

TABLE 7

RPC Call Used to Create Lolbin

| Actor | Event | Target |
| --- | --- | --- |
| Suspicious.exe | calls | RPC method CreateScheduledTask |
| TaskSched.exe | creates | process reg.exe |
| Reg.exe | writes | value HKLM\Services\Dodgy\ImageName = "nasty.exe" |

TABLE 8

Lolbin Creates a Lolbin

| Actor | Event | Target |
| --- | --- | --- |
| Suspicious.exe | creates process | powershell.exe |
| Powershell.exe | creates | process regedit.exe |
| Regedit.exe | writes | value HKLM\Services\Dodgy\StartType = 3 |

This shows the iterative nature of the present method. The third event shows an RPC call being used to create a lolbin. The fourth event shows a lolbin creating a lolbin. Further events could show a lolbin being used to issue an RPC call, or other techniques. Instead of handling these as a brand-new case, the processing is built up from substeps of following responsible chains. Method 1100 incorporates some of this processing. If a lolbin was used to issue an RPC call (for example, the wmic.exe program that is part of Windows), then once the RPC reattribution is done, the system may continue the reattribution because it notes that wmic.exe was previously marked as a lolbin.

In the case where a lolbin is used to create another lolbin (powershell.exe creating regedit.exe), then the create process event will itself be reattributed and be used as a source of reattribution information for this later registry write.

Figure 12A:
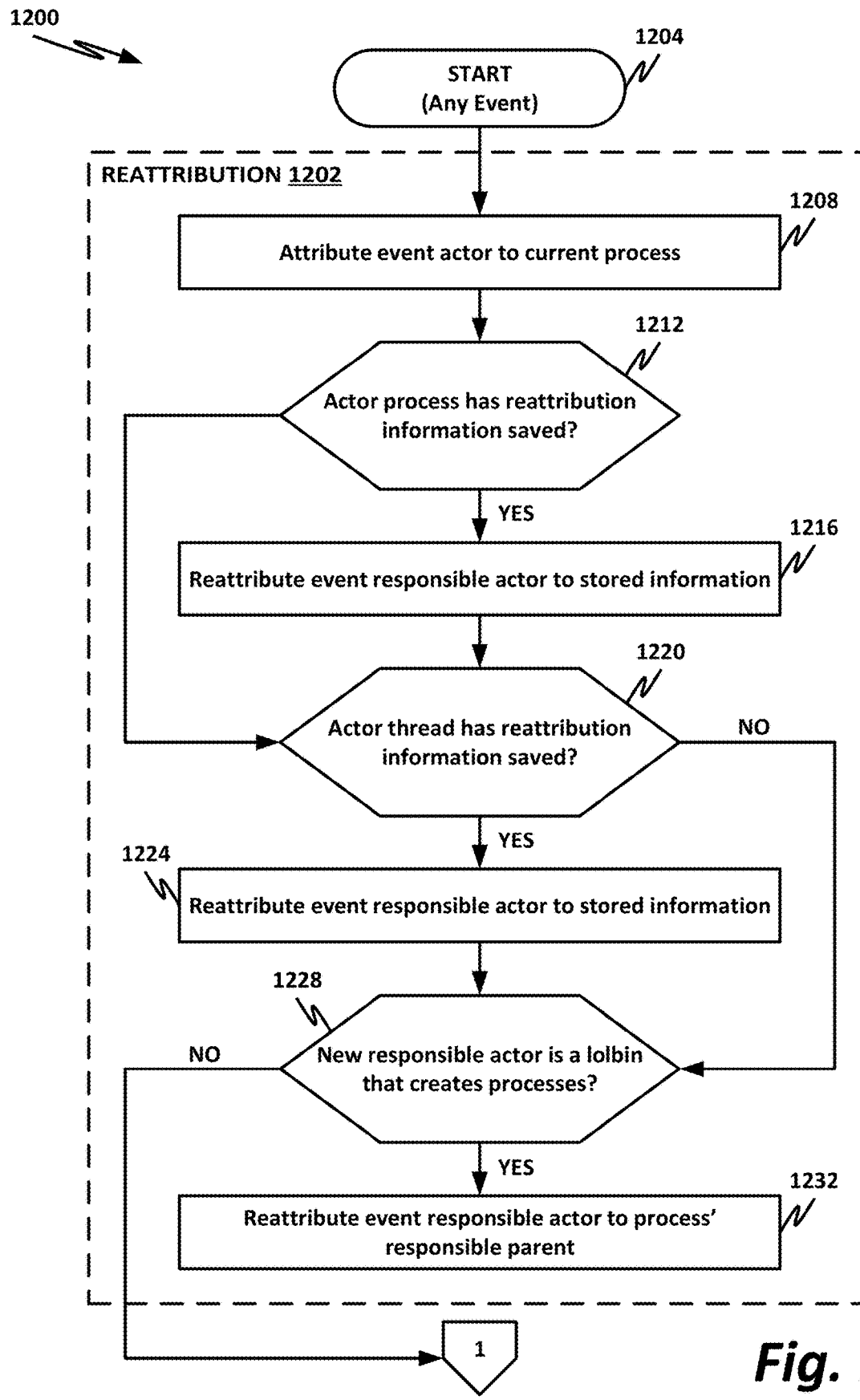
FIGS. 12A-12B are a flowchart of a further additional method.
Figure 12B:
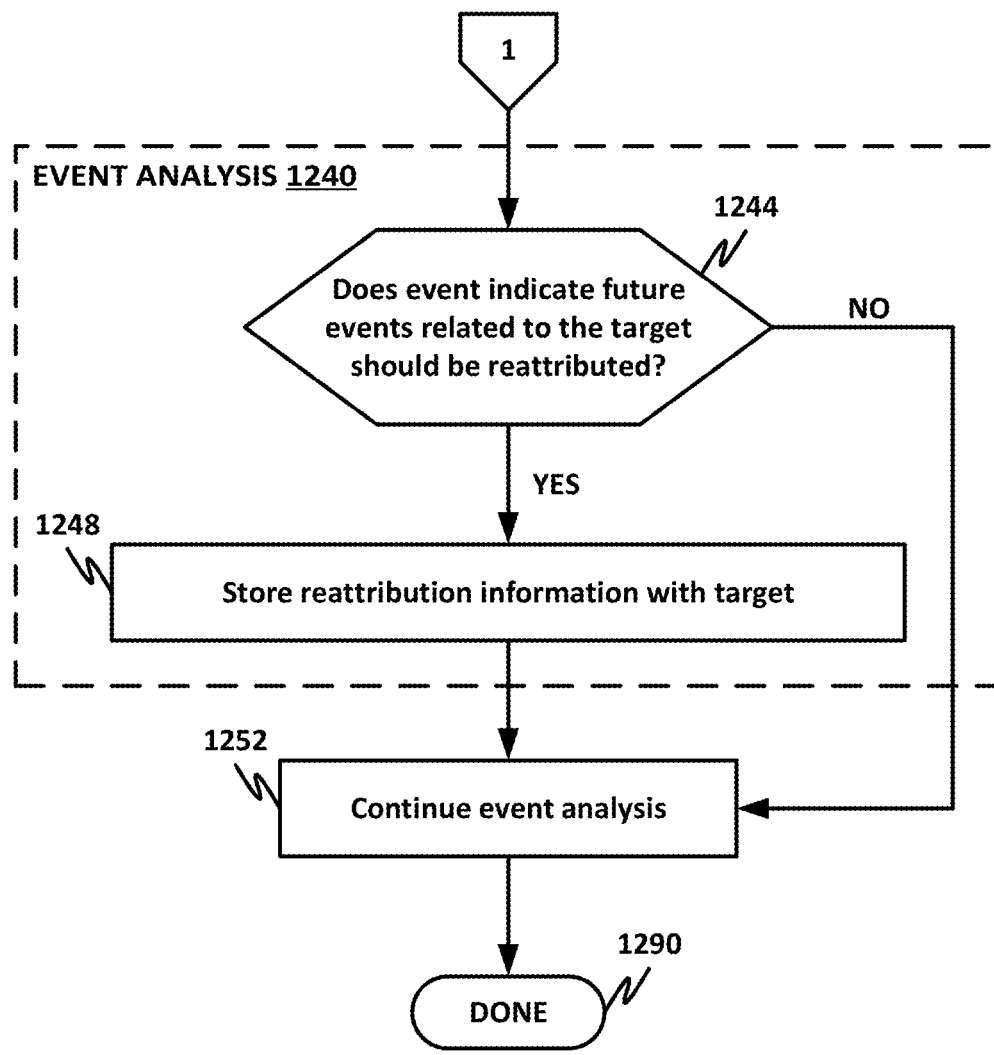

FIGS. 12A-12B are a flowchart of a method 1200. In contrast with the previous flowcharts, which illustrated a method as applied to a particular process creation chain, FIGS. 12A-12B illustrate a method that is more generalized as an approach.

In block 1204 of FIG. 12A, some event is the stimulus for the method. Metablock 1202 handles reattribution.

In block 1208, the system attributes the current process as the event actor. This provides an initial attribution for the process.

In decision block 1212, the system determines whether another process has reattribution information saved. If it does not, then control passes to block 1220.

If there is reattribution information saved, then in block 1216, the system reattributes the responsible actor for the event, according to the stored information.

In decision block 1220, the system determines whether the actor thread has reattribution information saved. If it does not, then control passes to block 1228.

If there is reattribution information saved, then in block 1224, the system reattributes the event to the responsible actor, according to the stored information.

In decision block 1228, the system determines whether the new responsible actor is a lolbin that creates processes. If it is, then in block 1232, the system reattributes the process's responsible parent as the responsible actor. This reattribution loop continues until a responsible parent is found that is not a lolbin that creates processes.

Following off-page connector 1 to FIG. 12B, metablock 1240 provides event analysis.

In block 1244, the system determines whether an event indicates that future events related to the target should be reattributed. If not, then control passes to block 1252. If there are future events that should be reattributed, then in block 1248, the system stores reattribution information with the target.

In block 1252, the system determines event analysis. In particular, this event analysis could include providing the information in real-time or near real-time to a human for human analysis, to a machine learning (ML) engine or artificial intelligence (AI) device for AI analysis, or to some other analysis to provide the ultimate reattribution. Advantageously, because events can be grouped together according to their ultimate responsible parent, a human analyzer or an AI examining the events can more easily see that the events are related, and can draw inferences based on that relationship.

In block 1290, the method is done.

Figure 13:
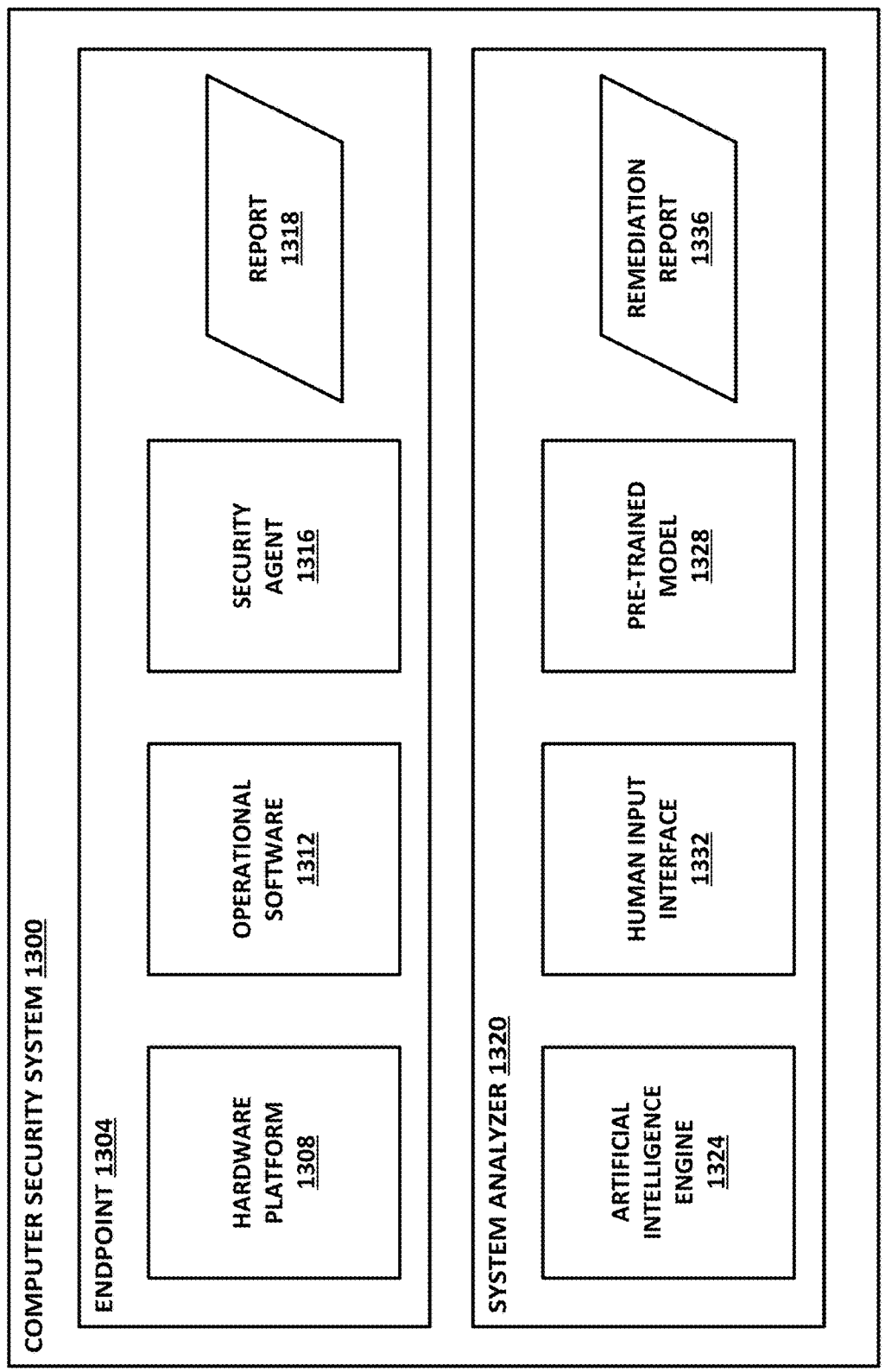
FIG. 13 is a block diagram showing a system-level view of a computer security system.

FIG. 13 is a block diagram showing a system-level view of a computer security system 1300. In this block diagram, certain hardware configurations and separations are implied, but this is a nonlimiting example, only. For example, computer security system 1300 is shown having an endpoint 1304, including a hardware platform 1308. System analyzer 1320 is shown as a separate block from endpoint 1304. However, this is only one option. In some cases, system analyzer 1320 could be integrated into endpoint 1304. In other cases, system analyzer 1320 could be provided separately, such as via a service appliance in the enterprise, a virtual machine, a container, or a cloud-based service.

In this example, endpoint 1304 includes hardware platform 1308. Running on hardware platform 1308 are operational software 1312 and security agent 1316. Operational software 1312 may include software that performs the intended function of endpoint 1304. For example, if endpoint 1304 is a business class machine, then operational software 1312 could include, in addition to an operating system, word processing, spreadsheets, business functions, networking functions, and administrative functions. On the other hand, if operational software 1312 is an engineering workstation, then endpoint 1304 could have different hardware, and in addition to those functions, could provide computer-aided design (CAD) software, engineering software, and other functions. Many other configurations are also possible.

Security agent 1316 is provided to protect endpoint 1304 and operational software 1312 from intrusion or tampering. For example, security agent 1316 may include an antivirus agent, and could also include anti-malware, anti-phishing, and anti-adware utilities, as well as a URL reputation engine, or other features. Security agent 1316 may be configured to carry out methods according to the teachings of the present specification, including, for example, the methods disclosed in the previous FIGURES that identify a plurality of actions having different actors, and identify for the plurality of actions a common responsible actor. Security agent 1316 can compile these data into a report 1318, which groups certain actions by their common responsible actor. This report could be provided to a system analyzer 1320. In some cases, the report could be encrypted and/or signed, such as via a trusted platform module (TPM), a trusted execution environment (TEE), or some other security mechanism that verifies the integrity of report 1318.

System analyzer 1320 could run on endpoint 1304, or it could be a separate service, such as an appliance, container, virtual machine (VM), or cloud service, by way of illustrative and nonlimiting example.

System analyzer 1320 may also run on a hardware platform, and that hardware platform may be the same as hardware platform 1308, or it may be a different hardware platform.

System analyzer 1320 includes an artificial intelligence engine 1324, which can provide an AI or ML algorithm. This algorithm can be used to classify events or actors. In some cases, and particularly in a case where AI engine 1324 runs on the endpoint itself, it may be beneficial to provide a pre-trained model 1328. This includes a model that has been trained on a large data set of previously identified objects, actions, actors, and processes. This pre-trained model 1328 can then be used by AI engine 1324 to analyze chains of events or responsible actors. Note that in the case of a large cloud system or other system where greater resources are available (and, in particular, where it may be possible to provide accelerators or graphics processing units (GPUs) that can run large ML models), a pre-trained model 1328 may not be necessary. Instead, AI engine 1324 can train its own model on a large input data set.

In some embodiments, a human input interface 1332 may be provided. Human input interface 1332 can be used to receive human feedback, correction, or input to help define the model, and also to correct results. Human input interface 1332 could also be used by a human user to manually analyze certain data sets, characterize those data sets (such as identifying an action or responsible actor as malicious or benign), and then provide that information back to the system. The system can be used to make real-time or near real-time decisions, and in some cases, can also be rolled back into the pre-trained model 1328 to improve the accuracy of the model for future analysis.

System analyzer 1320 prepares a remediation report 1336. Remediation report 1336 may include, for example, any remedial actions that may need to be taken responsive to the actions or actors identified in report 1318. As before, remediation report 1336 could be encrypted, signed, or otherwise verified to ensure that it has not been tampered with. System analyzer 1320 can then provide remediation report 1336 to endpoint 1304, which can then execute or otherwise act on a remedial action provided by remediation report 1304.

Figure 14:
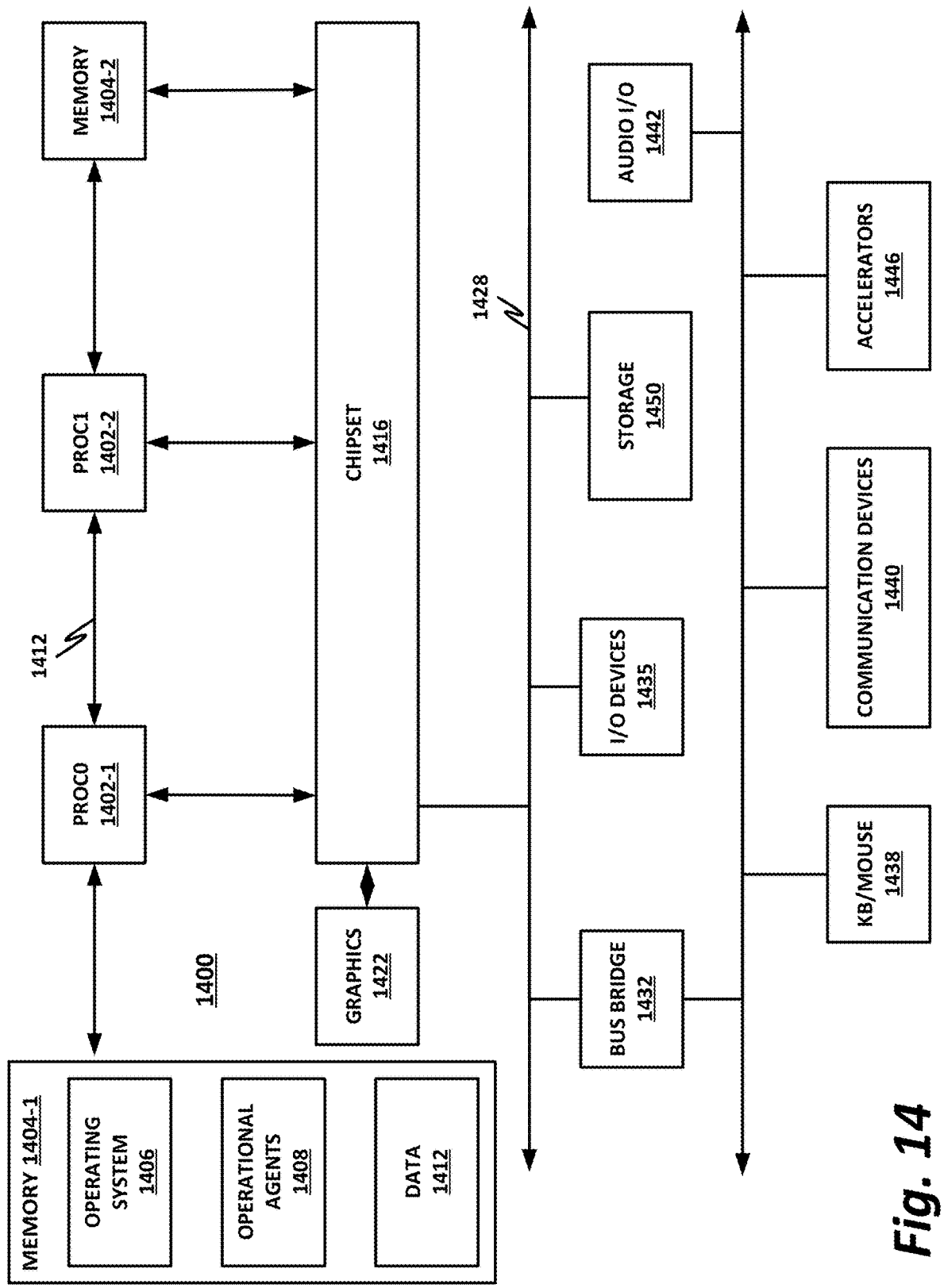
FIG. 14 is a block diagram of selected elements of a hardware platform.

FIG. 14 is a block diagram of a hardware platform 1400. In at least some embodiments, hardware platform 1400 may be configured or adapted to provide responsible parent process identification, according to the teachings of the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 1400, even though they may be scattered across a data center, or even located in different data centers.

Hardware platform 1400 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high-performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 1400 is arranged in a point-to-point (PtP) configuration. This PtP configuration is popular for personal computer (PC) and server-type devices, although it is not so limited, and any other bus type may be used.

Hardware platform 1400 is an example of a platform that may be used to implement embodiments of the teachings of this specification. For example, instructions could be stored in storage 1450. Instructions could also be transmitted to the hardware platform in an ethereal form, such as via a network interface, or retrieved from another source via any suitable interconnect. Once received (from any source), the instructions may be loaded into memory 1404, and may then be executed by one or more processor 1402 to provide elements such as an operating system 1406, operational agents 1408, or data 1412.

Hardware platform 1400 may include several processors 1402. For simplicity and clarity, only processors PROC0 1402-1 and PROC1 1402-2 are shown. Additional processors (such as 2, 4, 8, 16, 24, 32, 64, or 128 processors) may be provided as necessary, while in other embodiments, only one processor may be provided. Processors may have any number of cores, such as 1, 2, 4, 8, 16, 24, 32, 64, or 128 cores.

Processors 1402 may be any type of processor and may communicatively couple to chipset 1416 via, for example, PtP interfaces. Chipset 1416 may also exchange data with other elements, such as a high-performance graphics adapter 1422. In alternative embodiments, any or all of the PtP links illustrated in FIG. 14 could be implemented as any type of bus, or other configuration rather than a PtP link. In various embodiments, chipset 1416 may reside on the same die or package as a processor 1402 or on one or more different dies or packages. Each chipset may support any suitable number of processors 1402. A chipset 1416 (which may be a chipset, uncore, Northbridge, Southbridge, or other suitable logic and circuitry) may also include one or more controllers to couple other components to one or more central processor units (CPUs).

Two memories, 1404-1 and 1404-2 are shown, connected to PROC0 1402-1 and PROC1 1402-2, respectively. As an example, each processor is shown connected to its memory in a direct memory access (DMA) configuration, though other memory architectures are possible, including ones in which memory 1404 communicates with a processor 1402 via a bus. For example, some memories may be connected via a system bus, or in a data center, memory may be accessible in a remote DMA (RDMA) configuration.

Memory 1404 may include any form of volatile or nonvolatile memory including, without limitation, magnetic media (e.g., one or more tape drives), optical media, flash, random-access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 1404 may be used for short, medium, and/or long-term storage. Memory 1404 may store any suitable data or information utilized by platform logic. In some embodiments, memory 1404 may also comprise storage for instructions that may be executed by the cores of processors 1402 or other processing elements (e.g., logic resident on chipsets 1416) to provide functionality.

In certain embodiments, memory 1404 may comprise a relatively low-latency volatile main memory, while storage 1450 may comprise a relatively higher-latency nonvolatile memory. However, memory 1404 and storage 1450 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 1404 and storage 1450, for example, in a single physical memory device, and in other cases, memory 1404 and/or storage 1450 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 1422 may be configured to provide a human-readable visual output, such as a command line interface (CLI) or graphical desktop such as Microsoft Windows, Apple OSX desktop, or a Unix/Linux X Window System-based desktop. Graphics adapter 1422 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 1422 may include a hardware graphics card, which may have its own memory and its own GPU.

Chipset 1416 may be in communication with a bus 1428 via an interface circuit. Bus 1428 may have one or more devices that communicate over it, such as a bus bridge 1432, I/O devices 1435, accelerators 1446, communication devices 1440, and a keyboard and/or mouse 1438, by way of nonlimiting example. In general terms, the elements of hardware platform 1400 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 1440 can broadly include any communication not covered by a network interface and the various I/O devices described herein. This may include, for example, various universal serial bus (USB), FireWire, Lightning, or other serial or parallel devices that provide communications.

I/O Devices 1435 may be configured to interface with any auxiliary device that connects to hardware platform 1400 but that is not necessarily a part of the core architecture of hardware platform 1400. A peripheral may be operable to provide extended functionality to hardware platform 1400, and may or may not be wholly dependent on hardware platform 1400. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 1442 may provide an interface for audible sounds, and may include in some examples a hardware sound card. Sound output may be provided in analog (such as a 3.5 mm stereo jack), component ("RCA")

stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 1432 may be in communication with other devices such as a keyboard/mouse 1438 (or other input devices such as a touch screen, trackball, etc.), communication devices 1440 (such as modems, network interface devices, peripheral interfaces such as PCI or PCIe, or other types of communication devices that may communicate through a network), audio I/O 1442, and/or accelerators 1446. In alternative embodiments, any portions of the bus architectures could be implemented with one or more PtP links.

Operating system 1406 may be, for example, Microsoft Windows, Linux, UNIX, Mac OS X, iOS, MS-DOS, or an embedded or real-time operating system (including embedded or real-time flavors of the foregoing). In some embodiments, a hardware platform 1400 may function as a host platform for one or more guest systems that invoke application (e.g., operational agents 1408).

Operational agents 1408 may include one or more computing engines that may include one or more non-transitory computer-readable mediums having stored thereon executable instructions operable to instruct a processor to provide operational functions. At an appropriate time, such as upon booting hardware platform 1400 or upon a command from operating system 1406 or a user or security administrator, a processor 1402 may retrieve a copy of the operational agent (or software portions thereof) from storage 1450 and load it into memory 1404. Processor 1402 may then iteratively execute the instructions of operational agents 1408 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 1400 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a LAN, metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 1400 may be virtualized, in particular the processor(s) and memory. For example, a virtualized environment may run on OS 1406, or OS 1406 could be replaced with a hypervisor or virtual machine manager. In this configuration, a virtual machine running on hardware platform 1400 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 14 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 15. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 15:
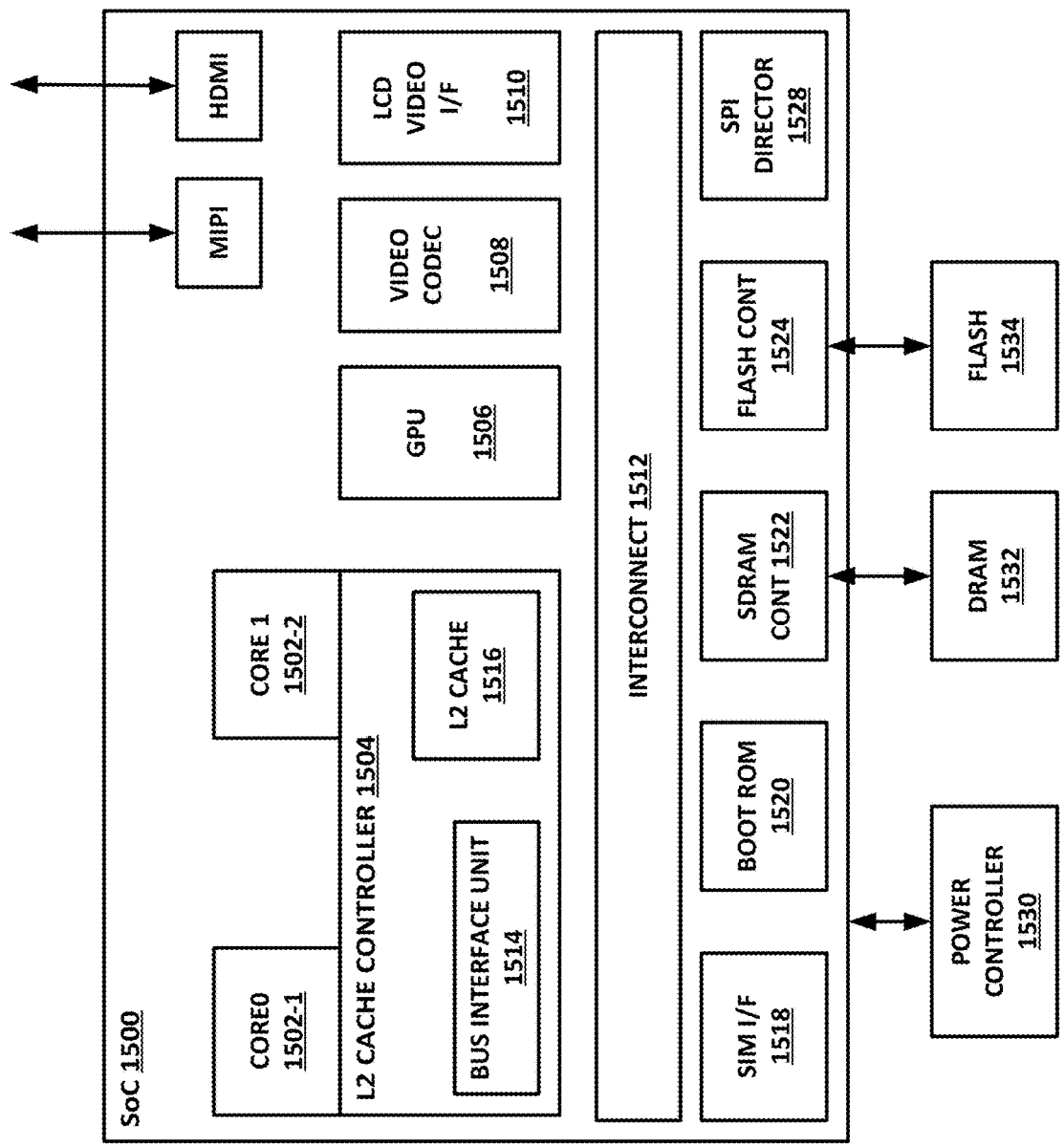
FIG. 15 is a block diagram of selected elements of a system-on-a-chip (SoC).

FIG. 15 is a block illustrating selected elements of an example SoC 1500. In at least some embodiments, SoC 1500 may be configured or adapted to provide responsible parent process identification, according to the teachings of the present specification.

At least some of the teachings of the present specification may be embodied on an SoC 1500, or may be paired with an SoC 1500. SoC 1500 may include, or may be paired with, an advanced reduced instruction set computer machine (ARM) component. For example, SoC 1500 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 1500 could also be integrated into, for example, a PC, server, video processing components, laptop computer, notebook computer, netbook, or touch-enabled device.

As with hardware platform 1400 above, SoC 1500 may include multiple cores 1502-1 and 1502-2. In this illustrative example, SoC 1500 also includes an L2 cache control 1504, a GPU 1506, a video codec 1508, a liquid crystal display (LCD) I/F 1510 and an interconnect 1512. L2 cache control 1504 can include a bus interface unit 1514, a L2 cache 1516. Liquid crystal display (LCD) I/F 1510 may be associated with mobile industry processor interface (MIPI)/HDMI links that couple to an LCD.

SoC 1500 may also include a subscriber identity module (SIM) I/F 1518, a boot ROM 1520, a synchronous dynamic random access memory (SDRAM) controller 1522, a flash controller 1524, a serial peripheral interface (SPI) director 1528, a suitable power control 1530, a dynamic RAM (DRAM) 1532, and flash 1534. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 1500 (or other integrated circuits) may use intellectual property blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

Figure 16:
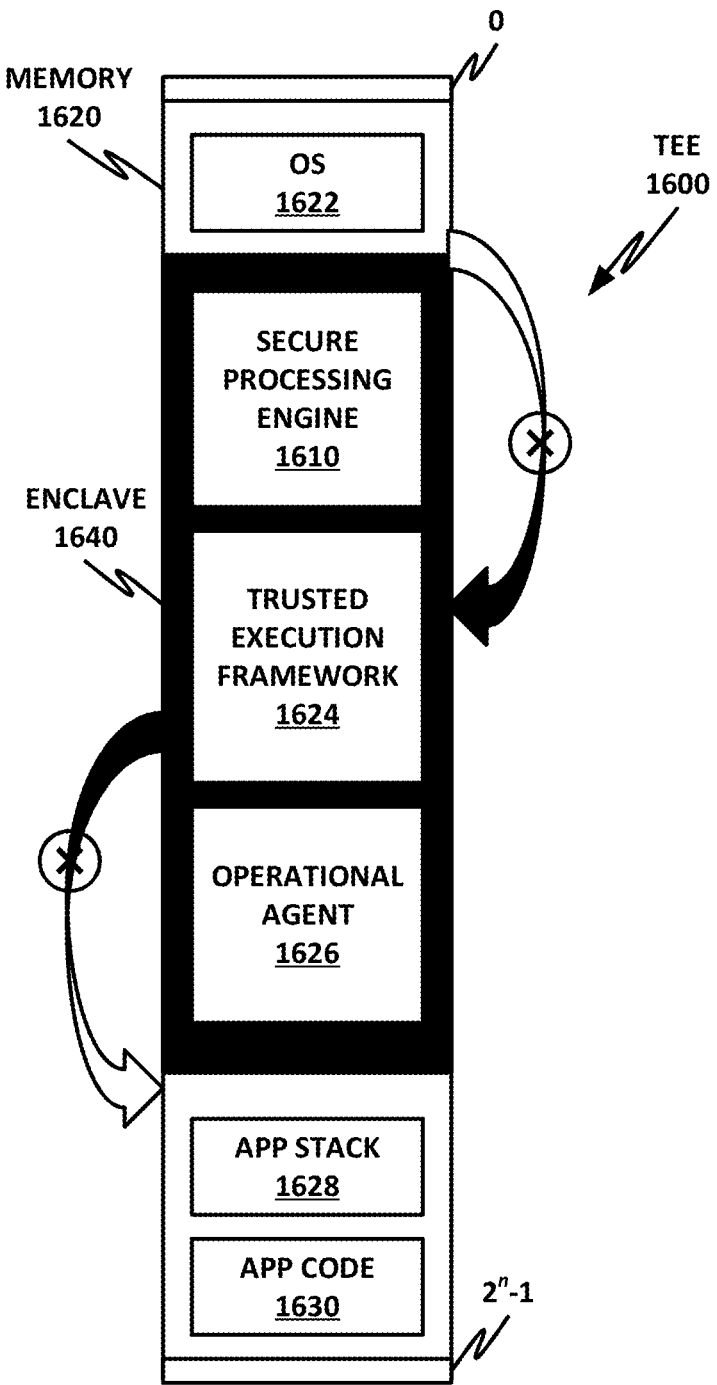
FIG. 16 is a block diagram of selected elements of a trusted execution environment (TEE).

FIG. 16 is a block diagram of a trusted execution environment (TEE) 1600. A TEE such as the one disclosed in FIG. 16 could be used in conjunction with embodiments of this disclosure. For example, as discussed above, a security agent may generate a report that groups certain actions by their common responsible actor. In some cases, the report could be encrypted and/or signed via a TEE of the present specification.

In the example of FIG. 16, memory 1620 is addressable by n-bits, ranging in address from 0 to $2^n-1$ (note, however, that in many cases, the size of the address space may far exceed the actual memory available). Within memory 1620 is an OS 1622, enclave 1640, application stack 1620, and application code 1630.

In this example, enclave 1640 is a specially-designated portion of memory 1620 that cannot be entered into or exited from except via special instructions, such as Intel Software Guard Extensions (SGX) or similar. Enclave 1640 is provided as an example of a secure environment which, in conjunction with a secure processing engine 1610, forms a TEE 1600 on a hardware platform such as platform 1400 of FIG. 14. A TEE 1600 is a combination of hardware, software, and/or memory allocation that provides the ability to securely execute instructions without interference from outside processes, in a verifiable way. By way of example, TEE 1600 may include memory enclave 1640 or some other protected memory area, and a secure processing engine 1610, which includes hardware, software, and instructions for accessing and operating on enclave 1640. Nonlimiting examples of solutions that either are or that can provide a TEE include Intel SGX, ARM TrustZone, AMD Platform Security Processor, Kinibi, securiTEE, OP-TEE, TLK, T6, Open TEE, SierraTEE, CSE, VT-x, MemCore, Canary Island, Docker, and Smack. Thus, it should be noted that in an example, secure processing engine 1610 may be a user-mode application that operates via trusted execution framework 1624 within enclave 1640. TEE 1600 may also conceptually include processor instructions that secure processing engine 1610, trusted execution framework 1624, and operational agent 1626 require to operate within enclave 1640.

Secure processing engine 1610 and trusted execution framework 1624 may together form a trusted computing base (TCB), which is a set of programs or computational units that are trusted to be secure. Conceptually, it may be advantageous to keep TCB relatively small so that there are fewer attack vectors for malware objects or for negligent software. Thus, for example, operating system 1622 may be excluded from TCB, in addition to the regular application stack 1628 and application code 1630.

In certain systems, computing devices equipped with Intel SGX or equivalent instructions may be capable of providing an enclave 1640. It should be noted, however, that many other examples of TEEs are available, and TEE 1600 is provided only as one example thereof. Other secure environments may include, by way of nonlimiting example, a virtual machine, sandbox, testbed, test machine, or other similar device or method for providing a TEE 1600.

In an example, enclave 1640 provides a protected memory area that cannot be accessed or manipulated by ordinary computer instructions. Enclave 1640 is described with particular reference to an Intel SGX enclave by way of example, but it is intended that enclave 1640 encompass any secure processing area with suitable properties, regardless of whether it is called an "enclave."

One feature of an enclave is that once an enclave region 1640 of memory 1620 is defined, as illustrated, a program pointer cannot enter or exit enclave 1640 without the use of special enclave instructions or directives, such as those provided by Intel SGX architecture. For example, SGX™ processors provide the ENCLU[EENTER], ENCLU[ERESUME], and ENCLU[EEXIT]. These are the only instructions that may legitimately enter into or exit from enclave 1640.

Thus, once enclave 1640 is defined in memory 1404, a program executing within enclave 1640 may be safely verified to not operate outside of its bounds. This security feature means that secure processing engine 1610 is verifiably local to enclave 1640. Thus, when an untrusted packet provides its content to be rendered with trusted execution framework 1624 of enclave 1640, the result of the rendering is verified as secure.

Enclave 1640 may also digitally sign its output, which provides a verifiable means of ensuring that content has not been tampered with or modified since being rendered by secure processing engine 1610. A digital signature provided by enclave 1640 is unique to enclave 1640 and is unique to the hardware of the device hosting enclave 1640.

Figure 17:
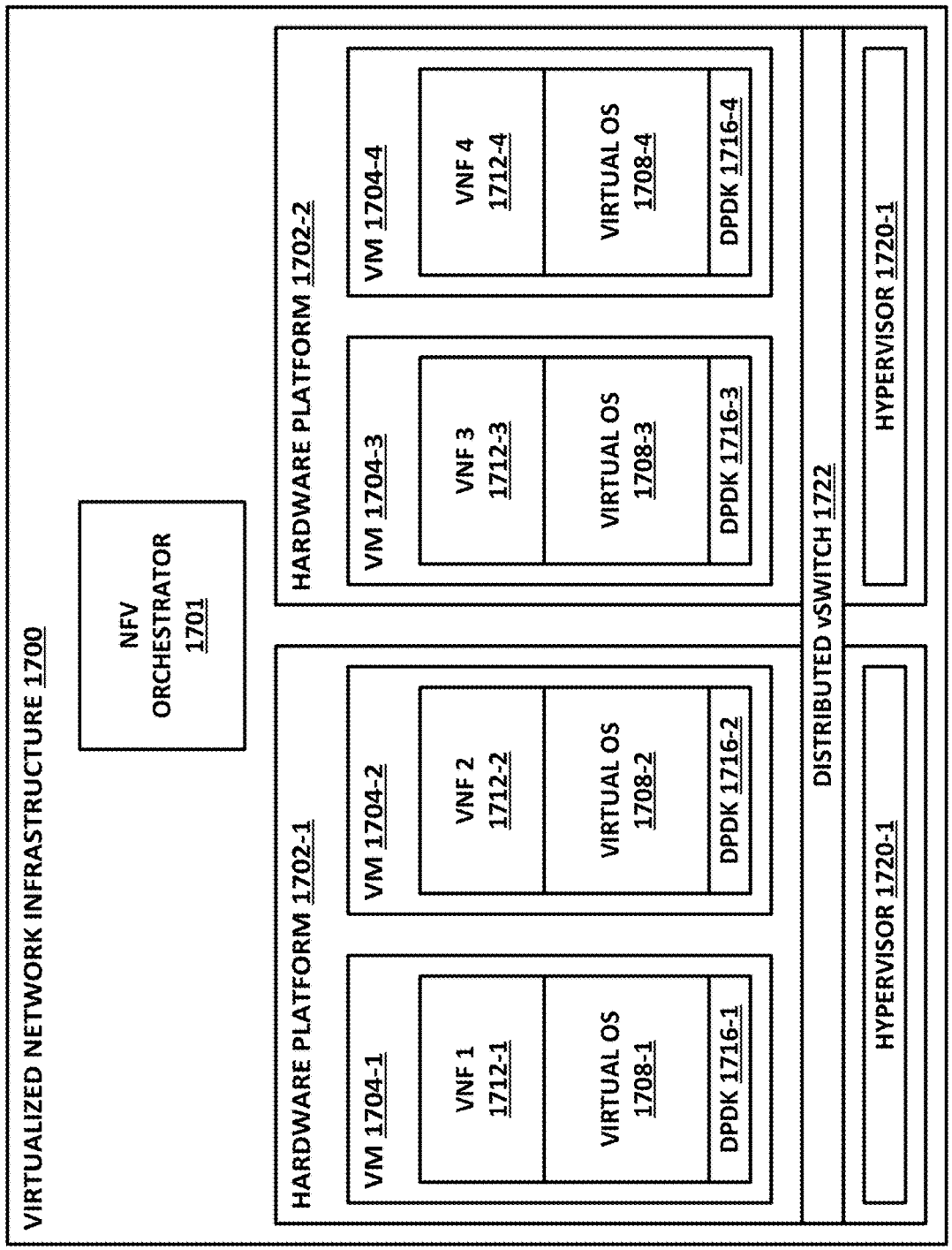
FIG. 17 is a block diagram of selected elements of a network function virtualization (NFV) infrastructure.

FIG. 17 is a block diagram of a network function virtualization (NFV) infrastructure 1700. A virtualization infrastructure such as the one illustrated in FIG. 17 could be used in conjunction with embodiments of this disclosure.

NFV is an aspect of network virtualization that is generally considered distinct from, but that can still interoperate with, software defined networking (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1700. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 17, an NFV orchestrator 1701 manages a number of the VNFs 1712 running on an NFVI 1700. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1701 a valuable system resource. Note that NFV orchestrator 1701 may provide a browser-based or graphical configuration interface, and in some embodiments may be integrated with SDN orchestration functions.

Note that NFV orchestrator 1701 itself may be virtualized (rather than a special-purpose hardware appliance). NFV orchestrator 1701 may be integrated within an existing SDN system, wherein an operations support system (OSS) manages the SDN. This may interact with cloud resource management systems (e.g., OpenStack) to provide NFV orchestration. An NFVI 1700 may include the hardware, software, and other infrastructure to enable VNFs to run. This may include a hardware platform 1702 on which one or more VMs 1704 may run. For example, hardware platform 1702-1 in this example runs VMs 1704-1 and 1704-2. Hardware platform 1702-2 runs VMs 1704-3 and 1704-4. Each hardware platform may include a hypervisor 1720, virtual machine manager (VMM), or similar function, which may include and run on a native (bare metal) operating system, which may be minimal so as to consume very few resources.

Hardware platforms 1702 may be or comprise a rack or several racks of blade or slot servers (including, e.g., processors, memory, and storage), one or more data centers, other hardware resources distributed across one or more geographic locations, hardware switches, or network interfaces. An NFVI 1700 may also include the software architecture that enables hypervisors to run and be managed by NFV orchestrator 1701.

Running on NFVI 1700 are a number of VMs 1704, each of which in this example is a VNF providing a virtual service appliance. Each VM 1704 in this example includes an instance of the Data Plane Development Kit (DPDK), a virtual operating system 1708, and an application providing the VNF 1712.

Virtualized network functions could include, as nonlimiting and illustrative examples, firewalls, intrusion detection systems, load balancers, routers, session border controllers, DPI services, network address translation (NAT) modules, or call security association.

The illustration of FIG. 17 shows that a number of VNFs 1704 have been provisioned and exist within NFVI 1700. This FIGURE does not necessarily illustrate any relationship between the VNFs and the larger network, or the packet flows that NFVI 1700 may employ.

The illustrated DPDK instances 1716 provide a set of highly-optimized libraries for communicating across a virtual switch (vSwitch) 1722. Like VMs 1704, vSwitch 1722 is provisioned and allocated by a hypervisor 1720. The hypervisor uses a network interface to connect the hardware platform to the data center fabric (e.g., a fabric). This fabric may be shared by all VMs 1704 running on a hardware platform 1702. Thus, a vSwitch may be allocated to switch traffic between VMs 1704. The vSwitch may be a pure software vSwitch (e.g., a shared memory vSwitch), which may be optimized so that data are not moved between memory locations, but rather, the data may stay in one place, and pointers may be passed between VMs 1704 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1722 is illustrated, wherein vSwitch 1722 is shared between two or more physical hardware platforms 1702.

Figure 18:
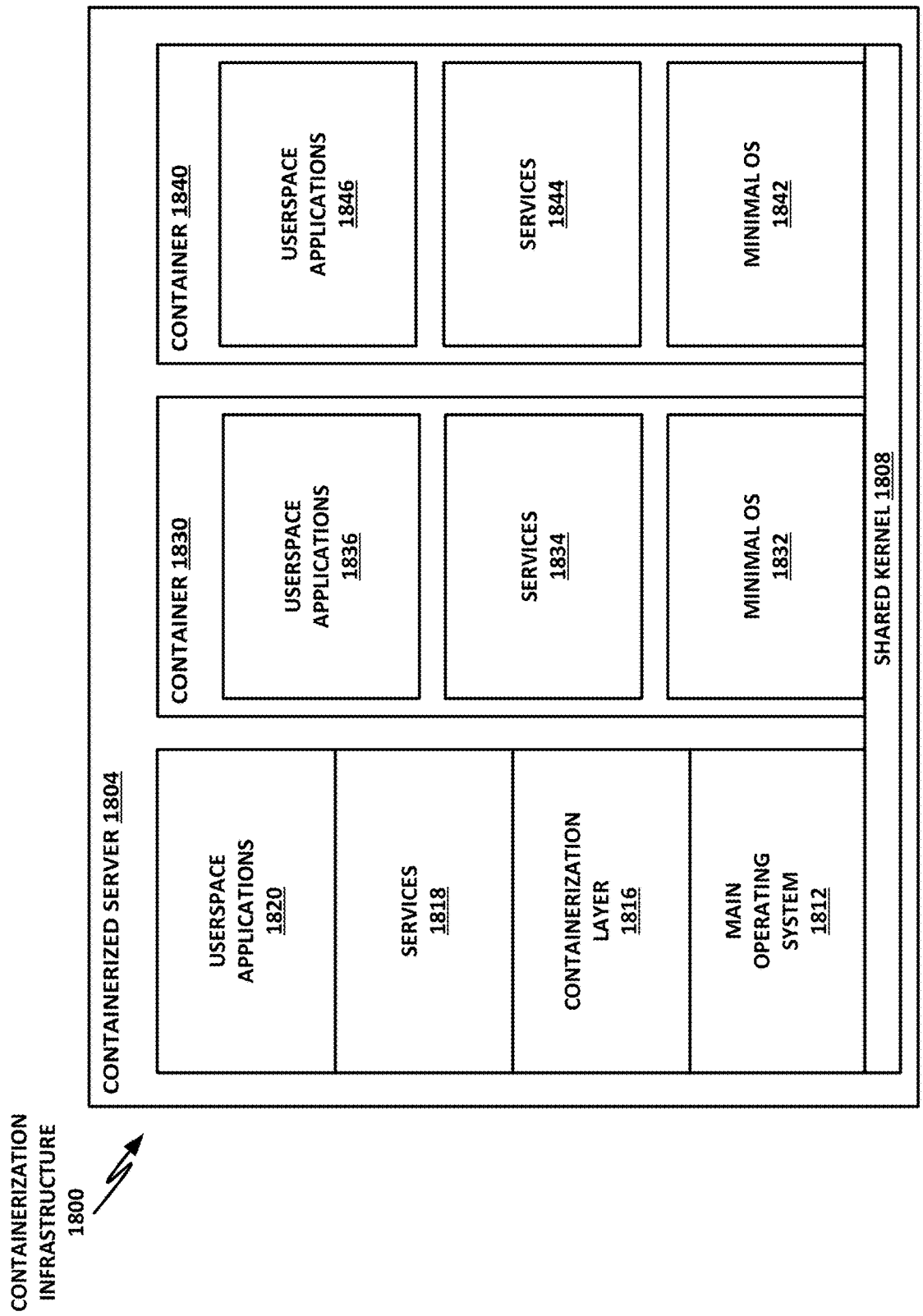
FIG. 18 is a block diagram of selected elements of a containerization infrastructure.

FIG. 18 is a block diagram of selected elements of a containerization infrastructure 1800. A containerization infrastructure such as the one illustrated in FIG. 18 could be used in conjunction with embodiments of this disclosure.

Like virtualization, containerization is a popular form of providing a guest infrastructure.

Containerization infrastructure 1800 runs on a hardware platform such as containerized server 1804. Containerized server 1804 may provide a number of processors, memory, one or more network interfaces, accelerators, and/or other hardware resources.

Running on containerized server 1804 is a shared kernel 1808. One distinction between containerization and virtualization is that containers run on a common kernel with the main operating system and with each other. In contrast, in virtualization, the processor and other hardware resources are abstracted or virtualized, and each virtual machine provides its own kernel on the virtualized hardware.

Running on shared kernel 1808 is main operating system 1812. Commonly, main operating system 1812 is a Unix or Linux-based operating system, although containerization infrastructure is also available for other types of systems, including Microsoft Windows systems and Macintosh systems. Running on top of main operating system 1812 is a containerization layer 1816. For example, Docker is a popular containerization layer that runs on a number of operating systems, and relies on the Docker daemon. Newer operating systems (including Fedora Linux 32 and later) that use version 2 of the kernel control groups service (cgroups v2) feature appear to be incompatible with the Docker daemon. Thus, these systems may run with an alternative known as Podman that provides a containerization layer without a daemon.

Various factions debate the advantages and/or disadvantages of using a daemon-based containerization layer versus one without a daemon, like Podman. Such debates are outside the scope of the present specification, and when the present specification speaks of containerization, it is intended to include containerization layers, whether or not they require the use of a daemon.

Main operating system 1812 may also include a number of services 1818, which provide services and interprocess communication to userspace applications 1820.

Services 1818 and userspace applications 1820 in this illustration are independent of any container.

As discussed above, a difference between containerization and virtualization is that containerization relies on a shared kernel. However, to maintain virtualization-like segregation, containers do not share interprocess communications, services, or many other resources. Some sharing of resources between containers can be approximated by permitting containers to map their internal file systems to a common mount point on the external file system. Because containers have a shared kernel with the main operating system 1812, they inherit the same file and resource access permissions as those provided by shared kernel 1808. For example, one popular application for containers is to run a plurality of web servers on the same physical hardware. The Docker daemon provides a shared socket, docker.sock, that is accessible by containers running under the same Docker daemon. Thus, one container can be configured to provide only a reverse proxy for mapping hypertext transfer protocol (HTTP) and hypertext transfer protocol secure (HTTPS) requests to various containers. This reverse proxy container can listen on docker.sock for newly spun up containers. When a container spins up that meets certain criteria, such as by specifying a listening port and/or virtual host, the reverse proxy can map HTTP or HTTPS requests to the specified virtual host to the designated virtual port. Thus, only the reverse proxy host may listen on ports 80 and 443, and any request to subdomain1.example.com may be directed to a virtual port on a first container, while requests to subdomain2.example.com may be directed to a virtual port on a second container.

Other than this limited sharing of files or resources, which generally is explicitly configured by an administrator of containerized server 1804, the containers themselves are completely isolated from one another. However, because they share the same kernel, it is relatively easier to dynamically allocate compute resources such as CPU time and memory to the various containers. Furthermore, it is common practice to provide only a minimum set of services on a specific container, and the container does not need to include a full bootstrap loader because it shares the kernel with a containerization host (i.e., containerized server 1804).

Thus, "spinning up" a container is often relatively faster than spinning up a new virtual machine that provides a similar service. Furthermore, a containerization host does not need to virtualize hardware resources, so containers access those resources natively and directly. While this provides some theoretical advantages over virtualization, modern hypervisors—especially type 1, or "bare metal," hypervisors—provide such near-native performance that this advantage may not always be realized.

In this example, containerized server 1804 hosts two containers, namely container 1830 and container 1840.

Container 1830 may include a minimal operating system 1832 that runs on top of shared kernel 1808. Note that a minimal operating system is provided as an illustrative example, and is not mandatory. In fact, container 1830 may perform as full an operating system as is necessary or desirable. Minimal operating system 1832 is used here as an example simply to illustrate that in common practice, the minimal operating system necessary to support the function of the container (which in common practice, is a single or monolithic function) is provided.

On top of minimal operating system 1832, container 1830 may provide one or more services 1834. Finally, on top of services 1834, container 1830 may also provide a number of userspace applications 1836, as necessary.

Container 1840 may include a minimal operating system 1842 that runs on top of shared kernel 1808. Note that a minimal operating system is provided as an illustrative example, and is not mandatory. In fact, container 1840 may perform as full an operating system as is necessary or desirable. Minimal operating system 1842 is used here as an example simply to illustrate that in common practice, the minimal operating system necessary to support the function of the container (which in common practice, is a single or monolithic function) is provided.

On top of minimal operating system 1842, container 1840 may provide one or more services 1844. Finally, on top of services 1844, container 1840 may also provide a number of userspace applications 1846, as necessary.

Using containerization layer 1816, containerized server 1804 may run a number of discrete containers, each one providing the minimal operating system and/or services necessary to provide a particular function. For example, containerized server 1804 could include a mail server, a web server, a secure shell server, a file server, a weblog, cron services, a database server, and many other types of services. In theory, these could all be provided in a single container, but security and modularity advantages are realized by providing each of these discrete functions in a discrete container with its own minimal operating system necessary to provide those services.

Figure 19:
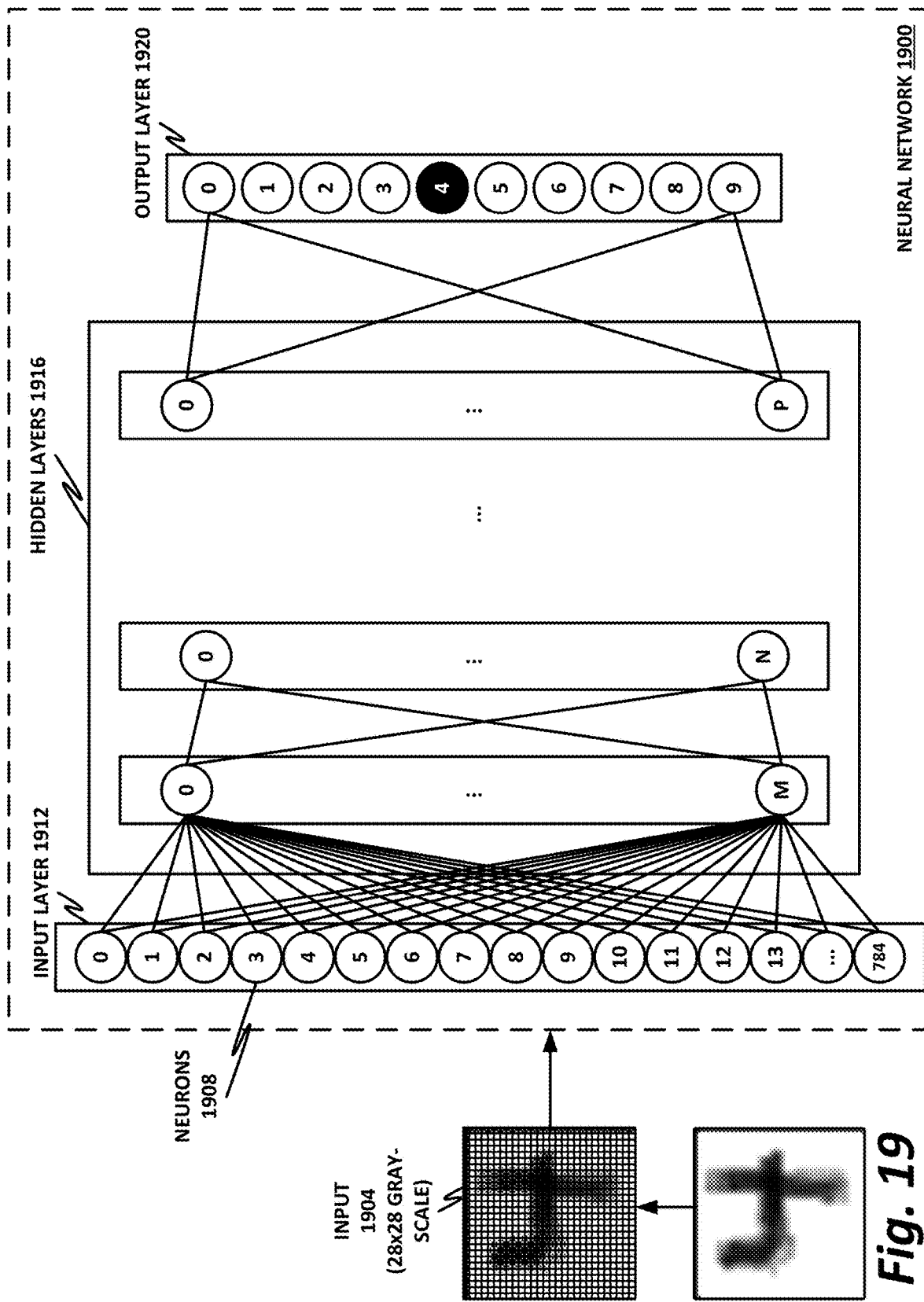
FIG. 19 illustrates machine learning according to a "textbook" problem with real-world applications.
Figure 20:
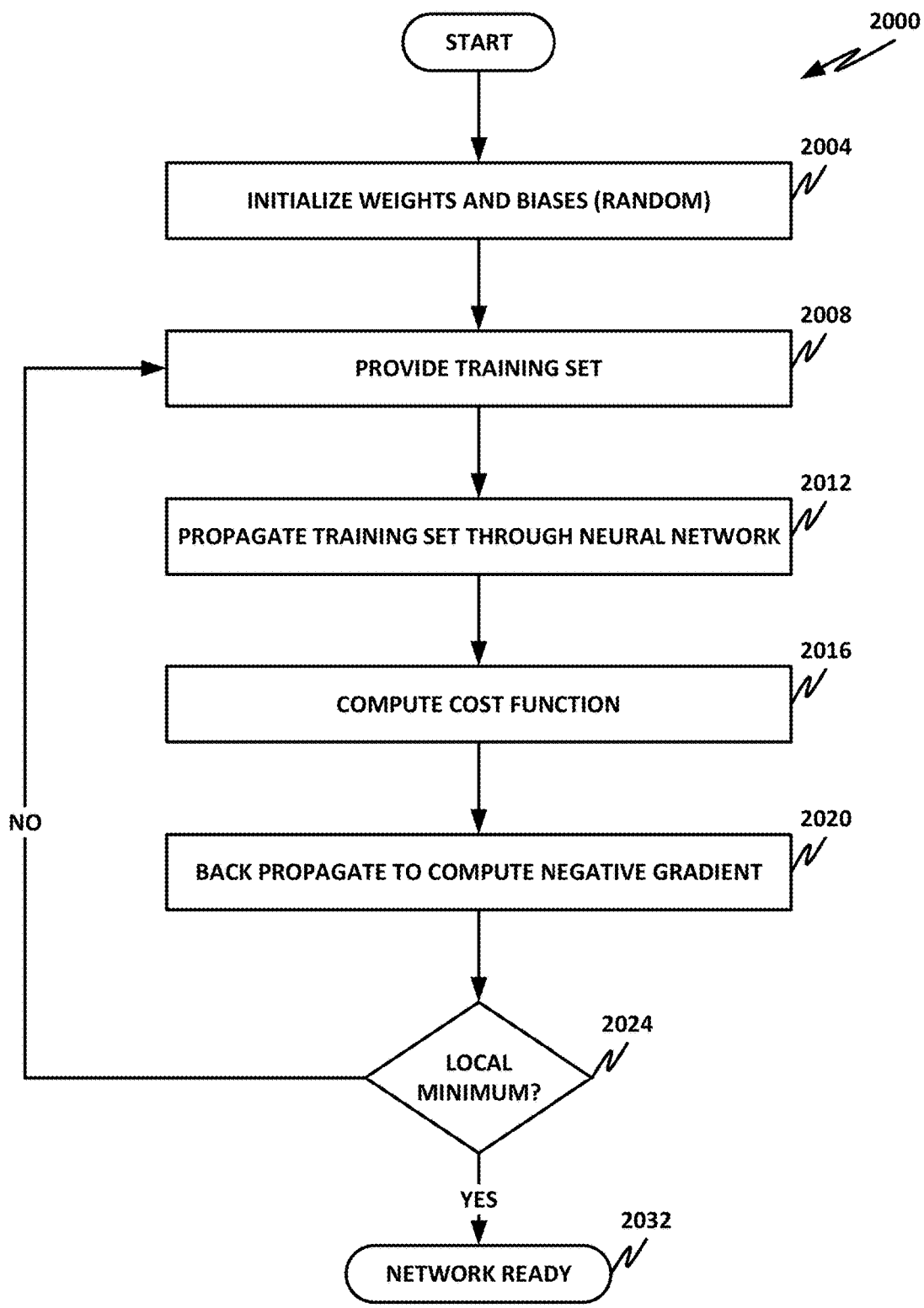
FIG. 20 is a flowchart of a method that may be used to train a neural network.
Figure 21:
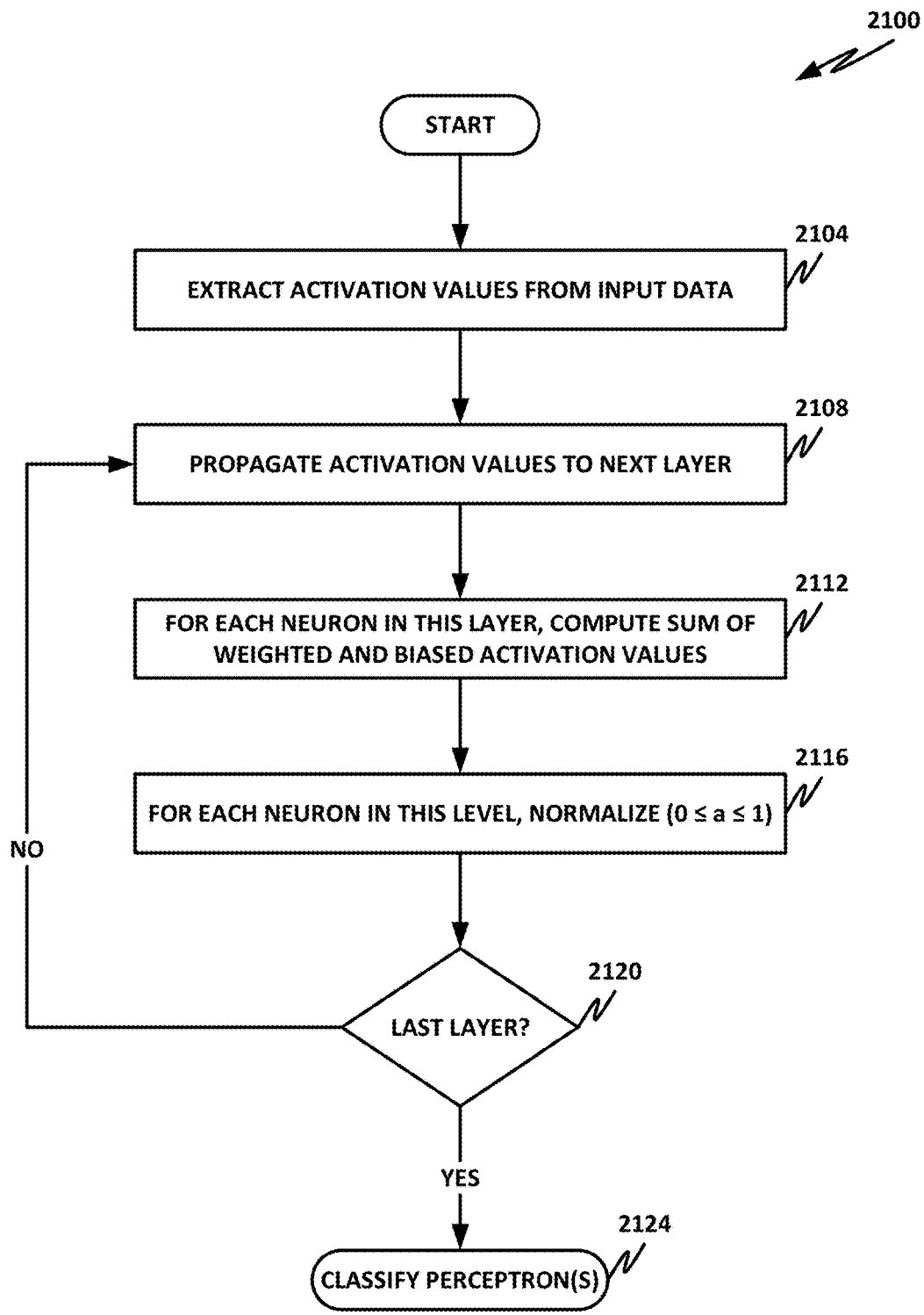
FIG. 21 is a flowchart of a method of using a neural network to classify an object.

FIGS. 19-21 illustrate selected elements of an AI system or architecture. In these FIGURES, an elementary neural network is used as a representative embodiment of an AI or ML architecture or engine. This should be understood to be a nonlimiting example, and other ML or AI architectures are available, including for example symbolic learning, robotics, computer vision, pattern recognition, statistical learning, speech recognition, natural language processing, deep learning, convolutional neural networks, recurrent neural networks, object recognition and/or others.

FIG. 19 illustrates machine learning according to a "textbook" problem with real-world applications. In this case, a neural network 1900 is tasked with recognizing characters. To simplify the description, neural network 1900 is tasked only with recognizing single digits in the range of 0 through 9. These are provided as an input image 1904. In this example, input image 1904 is a 28×28-pixel 8-bit grayscale image. In other words, input image 1904 is a square that is 28 pixels wide and 28 pixels high. Each pixel has a value between 0 and 255, with 0 representing white or no color, and 255 representing black or full color, with values in between representing various shades of gray. This provides a straightforward problem space to illustrate the operative principles of a neural network. It should be understood that only selected elements of neural network 1900 are illustrated in this FIGURE, and that real-world applications may be more complex, and may include additional features. Additional layers of complexity or functions may be provided in a neural network, or other AI architecture, to meet the demands of a particular problem. Indeed, the architecture here is sometimes referred to as the "Hello World" problem of machine learning, and is provided here as but one example of how the ML or AI functions of the present specification could be implemented.

In this case, neural network 1900 includes an input layer 1912 and an output layer 1920. In principle, input layer 1912 receives an input such as input image 1904, and at output layer 1920, neural network 1900 "lights up" a perceptron that indicates which character neural network 1900 thinks is represented by input image 1904.

Between input layer 1912 and output layer 1920 are some number of hidden layers 1916. The number of hidden layers 1916 will depend on the problem to be solved, the available compute resources, and other design factors. In general, the more hidden layers 1916, and the more neurons per hidden layer, the more accurate the neural network 1900 may become. However, adding hidden layers and neurons also increases the complexity of the neural network, and its demand on compute resources. Thus, some design skill is required to determine the appropriate number of hidden layers 1916, and how many neurons are to be represented in each hidden layer 1916.

Input layer 1912 includes, in this example, 784 "neurons" 1908. Each neuron of input layer 1912 receives information from a single pixel of input image 1904. Because input image 1904 is a 28×28 grayscale image, it has 784 pixels. Thus, each neuron in input layer 1912 holds 8 bits of information, taken from a pixel of input layer 1904. This 8-bit value is the "activation" value for that neuron.

Each neuron in input layer 1912 has a connection to each neuron in the first hidden layer in the network. In this example, the first hidden layer has neurons labeled 0 through M. Each of the M+1 neurons is connected to all 784 neurons in input layer 1912. Each neuron in hidden layer 1916 includes a kernel or transfer function, which is described in greater detail below. The kernel or transfer function determines how much "weight" to assign each connection from input layer 1912. In other words, a neuron in hidden layer 1916 may think that some pixels are more important to its function than other pixels. Based on this transfer function, each neuron computes an activation value for itself, which may be for example a decimal number between 0 and 1.

Each neuron in this layer is also connected to each neuron in the next layer, which has neurons from 0 to N. As in the previous layer, each neuron has a transfer function that assigns a particular weight to each of its M+1 connections, and computes its own activation value. In this manner, values are propagated along hidden layers 1916, until they reach the last layer, which has P+1 neurons labeled 0 through P. Each of these P+1 neurons has a connection to each neuron in output layer 1920. Output layer 1920 includes a number of neurons known as perceptrons that compute an activation value based on their weighted connections to each neuron in the last hidden layer 1916. The final activation value computed at output layer 1920 may be thought of as a "probability" that input image 1904 is the value represented by the perceptron. For example, if neural network 1900 operates perfectly, then perceptron 4 would have a value of 1.00, while each other perceptron would have a value of 0.00. This would represent a theoretically perfect detection. In practice, detection is not generally expected to be perfect, but it is desirable for perceptron 4 to have a value close to 1, while the other perceptrons have a value close to 0.

Conceptually, neurons in the hidden layers 1916 may correspond to "features." For example, in the case of computer vision, the task of recognizing a character may be divided into recognizing features such as the loops, lines, curves, or other features that make up the character. Recognizing each loop, line, curve, etc., may be further divided into recognizing smaller elements (e.g., line or curve segments) that make up that feature. Moving through the hidden layers from left to right, it is often expected and desired that each layer recognizes the "building blocks" that make up the features for the next layer. In practice, realizing this effect is itself a nontrivial problem, and may require greater sophistication in programming and training than is fairly represented in this simplified example.

The activation value for neurons in the input layer is simply the value taken from the corresponding pixel in the bitmap. The activation value (a) for each neuron in succeeding layers is computed according to a transfer function, which accounts for the "strength" of each of its connections to each neuron in the previous layer. The transfer can be written as a sum of weighted inputs (i.e., the activation value (a) received from each neuron in the previous layer, multiplied by a weight representing the strength of the neuron-to-neuron connection (w)), plus a bias value.

The weights may be used, for example, to "select" a region of interest in the pixmap that corresponds to a "feature" that the neuron represents. Positive weights may be used to select the region, with a higher positive magnitude representing a greater probability that a pixel in that region (if the activation value comes from the input layer) or a subfeature (if the activation value comes from a hidden layer) corresponds to the feature. Negative weights may be used for example to actively "de-select" surrounding areas or subfeatures (e.g., to mask out lighter values on the edge), which may be used for example to clean up noise on the edge of the feature. Pixels or subfeatures far removed from the feature may have for example a weight of zero, meaning those pixels should not contribute to examination of the feature.

The bias (b) may be used to set a "threshold" for detecting the feature. For example, a large negative bias indicates that the "feature" should be detected only if it is strongly detected, while a large positive bias makes the feature much easier to detect.

The biased weighted sum yields a number with an arbitrary sign and magnitude. This real number can then be normalized to a final value between 0 and 1, representing (conceptually) a probability that the feature this neuron represents was detected from the inputs received from the previous layer. Normalization may include a function such as a step function, a sigmoid, a piecewise linear function, a Gaussian distribution, a linear function or regression, or the popular "rectified linear unit" (ReLU) function. In the examples of this specification, a sigmoid function notation (a) is used by way of illustrative example, but it should be understood to stand for any normalization function or algorithm used to compute a final activation value in a neural network.

The transfer function for each neuron in a layer yields a scalar value. For example, the activation value for neuron "0" in layer "1" (the first hidden layer), may be written as:

$$a_0^{(1)} = \sigma(w_0 a_0^{(0)} + w_1 a_1^{(0)} + \ldots w_{783} a_{783}^{(0)} + b)$$

In this case, it is assumed that layer 0 (input layer 1912) has 784 neurons. Where the previous layer has "n" neurons, the function can be generalized as:

$$a_0^{(1)} = \sigma(w_0 a_0^{(0)} + w_1 a_1^{(0)} + \ldots w_n a_n^{(0)} + b)$$

A similar function is used to compute the activation value of each neuron in layer 1 (the first hidden layer), weighted with that neuron's strength of connections to each neuron in layer 0, and biased with some threshold value. As discussed above, the sigmoid function shown here is intended to stand for any function that normalizes the output to a value between 0 and 1.

The full transfer function for layer 1 (with k neurons in layer 1) may be written in matrix notation as:

$$a^{(1)} = \sigma\left(\begin{bmatrix} w_{0,0} & \cdots & w_{0,n} \\ \vdots & \ddots & \vdots \\ w_{(k,0)} & \cdots & w_{k,n} \end{bmatrix} \begin{bmatrix} a_0^{(0)} \\ \vdots \\ a_n^{(0)} \end{bmatrix} + \begin{bmatrix} b_0 \\ \vdots \\ b_n \end{bmatrix}\right)$$

More compactly, the full transfer function for layer 1 can be written in vector notation as:

$$a^{(1)} = \sigma(Wa^{(0)} + b)$$

Neural connections and activation values are propagated throughout the hidden layers 1916 of the network in this way, until the network reaches output layer 1920. At output layer 1920, each neuron is a "bucket" or classification, with the activation value representing a probability that the input object should be classified to that perceptron. The classifications may be mutually exclusive or multinominal. For example, in the computer vision example of character recognition, a character may best be assigned only one value, or in other words, a single character is not expected to be simultaneously both a "4" and a "9." In that case, the neurons in output layer 1920 are binomial perceptrons. Ideally, only one value is above the threshold, causing the perceptron to metaphorically "light up," and that value is selected. In the case where multiple perceptrons "light up," the one with the highest probability may be selected. The final result is that only one value (in this case, "4") should be "lit up," while the rest should be "dark." Indeed, if the neural network were perfect, the "4" neuron would have an activation value of 1.00, while each other neuron would have an activation value of 0.00.

In the case of multinominal perceptrons, more than one output may be "lit up." For example, a neural network may determine that a particular document has high activation values for perceptrons corresponding to several departments, such as Accounting, Information Technology (IT), and Human Resources. On the other hand, the activation values for perceptrons for Legal, Manufacturing, and Shipping are low. In the case of multinominal classification, a threshold may be defined, and any neuron in the output layer with a probability above the threshold may be considered a "match" (e.g., the document is relevant to those departments). Those below the threshold are considered not a match (e.g., the document is not relevant to those departments).

The weights and biases of the neural network act as parameters, or "controls," wherein features in a previous layer are detected and recognized. When the neural network is first initialized, the weights and biases may be assigned randomly or pseudo-randomly. Thus, because the weights and biases controls are garbage, the initial output is expected to be garbage. In the case of a "supervised" learning algorithm, the network is refined by providing a "training" set, which includes a number of objects with known results. Because the "right" answer for each object is known, training sets can be used to iteratively move the weights and biases away from garbage values, and toward more useful values.

A common method for refining values includes "gradient descent" and "back-propagation." An illustrative gradient descent method includes computing a "cost" function, which measures the error in the network. For example, in the illustration, the "4" perceptron ideally has a value of "1.00," while the other perceptrons have an ideal value of "0.00." The cost function takes the difference between each output and its ideal value, squares the difference, and then takes a sum of all of the differences. Each training example will have its own computed cost. Initially, the cost function is very large, because the network doesn't know how to classify objects. As the network is trained and refined, the cost function value is expected to get smaller, as the weights and biases are adjusted toward more useful values.

With, for example, 100,000 training examples in play, an average cost (e.g., a mathematical mean) can be computed across all 100,00 training examples. This average cost provides a quantitative measurement of how "badly" the neural network is doing its detection job.

The cost function can thus be thought of as a single, very complicated formula, where the inputs are the parameters (weights and biases) of the network. Because the network may have thousands or even millions of parameters, the cost function has thousands or millions of input variables. The output is a single value representing a quantitative measurement of the error of the network. The cost function can be represented as:

$$C(w)$$

Wherein w is a vector containing all of the parameters (weights and biases) in the network. The minimum (absolute and/or local) can then be represented as a trivial calculus problem, namely:

$$\frac{dC}{dw}(w) = 0$$

Solving such a problem symbolically may be prohibitive, and in some cases not even possible, even with heavy computing power available. Rather, neural networks commonly solve the minimizing problem numerically. For example, the network can compute the slope of the cost function at any given point, and then shift by some small amount depending on whether the slope is positive or negative. The magnitude of the adjustment may depend on the magnitude of the slope. For example, when the slope is large, it is expected that the local minimum is "far away," so larger adjustments are made. As the slope lessens, smaller adjustments are made to avoid badly overshooting the local minimum. In terms of multi-vector calculus, this is a gradient function of many variables:

$$-\nabla C(w)$$

The value of $-\nabla C$ is simply a vector of the same number of variables as w, indicating which direction is "down" for this multivariable cost function. For each value in $-\nabla C$, the sign of each scalar tells the network which "direction" the value needs to be nudged, and the magnitude of each scalar can be used to infer which values are most "important" to change.

Gradient descent involves computing the gradient function, taking a small step in the "downhill" direction of the gradient (with the magnitude of the step depending on the magnitude of the gradient), and then repeating until a local minimum has been found within a threshold.

While finding a local minimum is relatively straightforward once the value of $-\nabla C$, finding an absolutely minimum is many times harder, particularly when the function has thousands or millions of variables. Thus, common neural networks consider a local minimum to be "good enough," with adjustments possible if the local minimum yields unacceptable results. Because the cost function is ultimately an average "error" value over the entire training set, minimizing the cost function yields a (locally) lowest average error.

In many cases, the most difficult part of gradient descent is computing the value of $-\nabla C$. As mentioned above, computing this symbolically or exactly would be prohibitively difficult. A more practical method is to use "back-propagation" to numerically approximate a value for $-\nabla C$. Back-propagation may include, for example, examining an individual perceptron at the output layer, and determining an average cost value for that perceptron across the whole training set. Taking the "4" perceptron as an example, if the input image is a 4, it is desirable for the perceptron to have a value of 1.00, and for any input images that are not a 4, it is desirable to have a value of 0.00. Thus, an overall or average desired adjustment for the "4" perceptron can be computed.

However, the perceptron value is not hard-coded, but rather depends on the activation values received from the previous layer. The parameters of the perceptron itself (weights and bias) can be adjusted, but it may also be desirable to receive different activation values from the previous layer. For example, where larger activation values are received from the previous layer, the weight is multiplied by a larger value, and thus has a larger effect on the final activation value of the perceptron. The perceptron essentially "wishes" that certain activations from the previous layer were larger or smaller. Those "wishes" can be back-propagated to the previous-layer neurons.

At the next layer, the neuron takes into account the "wishes" from the next downstream layer in determining its own "preferred" activation value. Again, at this layer, the activation values are not hard-coded. Each neuron can adjust its own weights and biases, and then back-propagate changes to the activation values that it "wishes" would occur. The back-propagation continues, layer by layer, until the weights and biases of the first hidden layer are set. This layer cannot back-propagate desired changes to the input layer, because the input layer receives activation values directly from the input image.

After a round of "nudging," the network may receive another round of training with the same or a different training data set, and the process is repeated until a local and/or global minimum value is found for the cost function.

FIG. 20 is a flowchart of a method 2000. Method 2000 may be used to train a neural network, such as neural network 1900 of FIG. 19.

In block 2004, the network is initialized. Initially, neural network 1900 includes some number of neurons. Each neuron includes a transfer function or kernel. In the case of a neural network, each neuron includes parameters such as the weighted sum of values of each neuron from the previous layer, plus a bias. The final value of the neuron may be normalized to a value between 0 and 1, using a function such as the sigmoid or ReLU. Because the untrained neural network knows nothing about its problem space, and because it would be very difficult to manually program the neural network to perform the desired function, the parameters for each neuron may initially be set to just some random value. For example, the values may be selected using a pseudorandom number generator of a CPU, and then assigned to each neuron.

In block 2008, the neural network is provided a training set. In some cases, the training set may be divided up into smaller groups. For example, if the training set has 100,000 objects, this may be divided into 1,000 groups, each having 100 objects. These groups can then be used to incrementally train the neural network. In block 2008, the initial training set is provided to the neural network. Alternatively, the full training set could be used in each iteration.

In block 2012, the training data are propagated through the neural network. Because the initial values are random, and are therefore essentially garbage, it is expected that the output will also be a garbage value. In other words, if neural network 1900 of FIG. 19 has not been trained, when input image 1904 is fed into the neural network, it is not expected with the first training set that output layer 1920 will light up perceptron 4. Rather, the perceptrons may have values that are all over the map, with no clear winner, and with very little relation to the number 4.

In block 2016, a cost function is computed as described above. For example, in neural network 1900, it is desired for perceptron 4 to have a value of 1.00, and for each other perceptron to have a value of 0.00. The difference between the desired value and the actual output value is computed and squared. Individual cost functions can be computed for each training input, and the total cost function for the network can be computed as an average of the individual cost functions.

In block 2020, the network may then compute a negative gradient of this cost function to seek a local minimum value of the cost function, or in other words, the error. For example, the system may use back-propagation to seek a negative gradient numerically. After computing the negative gradient, the network may adjust parameters (weights and biases) by some amount in the "downward" direction of the negative gradient.

After computing the negative gradient, in decision block 2024, the system determines whether it has reached a local minimum (e.g., whether the gradient has reached 0 within the threshold). If the local minimum has not been reached, then the neural network has not been adequately trained, and control returns to block 2008 with a new training set. The training sequence continues until, in block 2024, a local minimum has been reached.

Now that a local minimum has been reached and the corrections have been back-propagated, in block 2032, the neural network is ready.

FIG. 21 is a flowchart of a method 2100. Method 2100 illustrates a method of using a neural network, such as network 1900 of FIG. 19, to classify an object.

In block 2104, the network extracts the activation values from the input data. For example, in the example of FIG. 19, each pixel in input image 1904 is assigned as an activation value to a neuron 1908 in input layer 1912.

In block 2108, the network propagates the activation values from the current layer to the next layer in the neural network. For example, after activation values have been extracted from the input image, those values may be propagated to the first hidden layer of the network.

In block 2112, for each neuron in the current layer, the neuron computes a sum of weighted and biased activation values received from each neuron in the previous layer. For example, in the illustration of FIG. 19, neuron 0 of the first hidden layer is connected to each neuron in input layer 1912. A sum of weighted values is computed from those activation values, and a bias is applied.

In block 2116, for each neuron in the current layer, the network normalizes the activation values by applying a function such as sigmoid, ReLU, or some other function.

In decision block 2120, the network determines whether it has reached the last layer in the network. If this is not the last layer, then control passes back to block 2108, where the activation values in this layer are propagated to the next layer.

Returning to decision block 2120, If the network is at the last layer, then the neurons in this layer are perceptrons that provide final output values for the object. In terminal 2124, the perceptrons are classified and used as output values.

Figure 22:
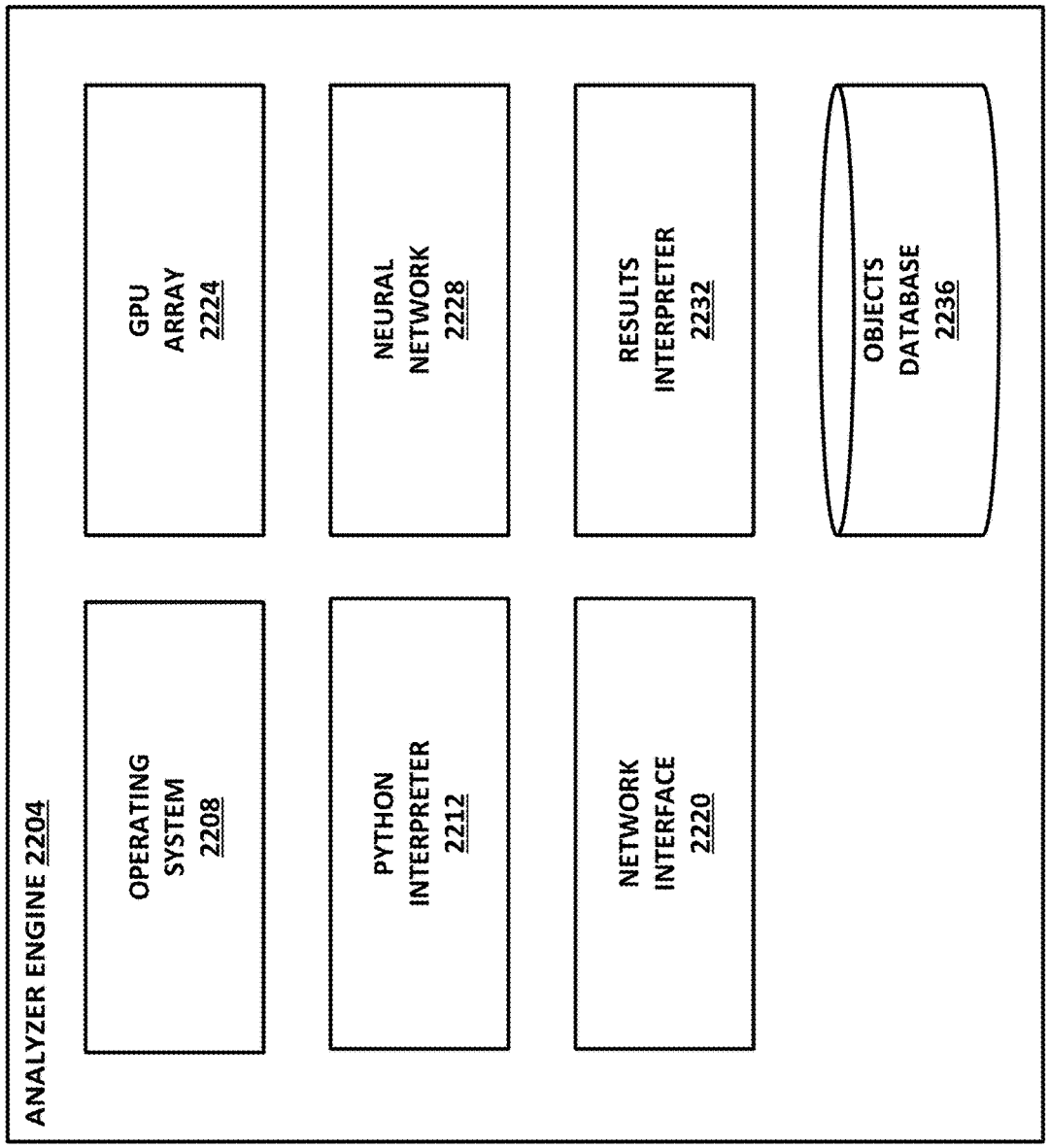
FIG. 22 is a block diagram illustrating selected elements of an analyzer engine.

FIG. 22 is a block diagram illustrating selected elements of an analyzer engine 2204. Analyzer engine 2204 may be configured to provide analysis services, such as via a neural network. FIG. 22 illustrates a platform for providing analysis services. Analysis, such as neural analysis and other ML models, may be used in some embodiments to provide one or more features of the present disclosure.

Note that analyzer engine 2204 is illustrated here as a single modular object, but in some cases, different aspects of analyzer engine 2204 could be provided by separate hardware, or by separate guests (e.g., virtual machines or containers) on a hardware system.

Analyzer engine 2204 includes an operating system 2208. Commonly, operating system 2208 is a Linux operating system, although other operating systems, such as Microsoft Windows, Mac OS X, or similar could be used. Analyzer engine 2204 also includes a Python interpreter 2212, which can be used to run Python programs. A Python module known as Numerical Python (NumPy) is often used for neural network analysis. Although this is a popular choice, other non-Python or non-NumPy-based systems could also be used. For example, the neural network could be implemented in Matrix Laboratory (MATLAB), C, C++, Fortran, R, or some other compiled or interpreted computer language.

GPU array 2224 may include an array of graphics processing units that may be used to carry out the neural network functions of neural network 2228. Note that GPU arrays are a popular choice for this kind of processing, but neural networks can also be implemented in CPUs, or in ASICs or FPGAs that are specially designed to implement the neural network.

Neural network 2228 includes the actual code for carrying out the neural network, and as mentioned above, is commonly programmed in Python.

Results interpreter 2232 may include logic separate from the neural network functions that can be used to operate on the outputs of the neural network to assign the object for particular classification, perform additional analysis, and/or provide a recommended remedial action.

Objects database 2236 may include a database of known malware objects and their classifications. Neural network 2228 may initially be trained on objects within objects database 2236, and as new objects are identified, objects database 2236 may be updated with the results of additional neural network analysis.

Once final results have been obtained, the results may be sent to an appropriate destination via network interface 2220.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A computing apparatus, comprising:
a hardware platform comprising a processor circuit and a memory; and
instructions encoded within the memory to instruct the processor circuit to:
trace, for a plurality of events having different direct parent processes, a common responsible parent actor, wherein the instructions determine that the common responsible parent actor caused or directed the plurality of events, wherein the common responsible parent actor is a source of persistency that operates on a trusted process that is not inherently malicious that can be used maliciously by the source of persistency;
compile a report of the plurality of events, wherein the events are grouped by the common responsible parent actor;
send the report to a machine or human analysis agent;
responsive to the report, receive from the analysis agent a remedial action to remediate the source of persistency; and
execute the remedial action.

2. The computing apparatus of claim 1, wherein the report further associates the plurality of events with their direct parent processes.

3. The computing apparatus of claim 1, wherein the report further associates the plurality of events with their targets.

4. The computing apparatus of claim 1, wherein determining that the common responsible parent actor caused or directed the events comprises determining that the common responsible parent actor is a living off the land binary (lolbin) or a living off the land binary and script (lolbas).

5. The computing apparatus of claim 4, wherein determining that the common responsible parent actor caused or directed the events further comprises iteratively examining next-level direct parent processes.

6. The computing apparatus of claim 5, wherein iteratively examining next-level direct parent processes comprises iterating until a parent is found that is not a lolbin or lolbas.

7. The computing apparatus of claim 5, wherein iteratively examining next-level direct parent processes comprises iterating until a parent is found that is a well-known process.

8. The computing apparatus of claim 5, wherein iteratively examining next-level direct parent processes comprises iterating until a parent is found that is a system process.

9. The computing apparatus of claim 1, wherein determining that the common responsible parent actor caused or directed the events further comprises iteratively inspecting direct parent processes in a hierarchy until a condition is met.

10. The computing apparatus of claim 9, wherein the condition is finding a process that is a well-known or system process.

11. The computing apparatus of claim 1, wherein a responsible parent process includes a process that created or changed a system registry value.

12. The computing apparatus of claim 1, wherein a responsible parent process includes a process that created or changed a system configuration file.

13. The computing apparatus of claim 1, wherein a responsible parent process includes a process that created or changed a system startup script.

14. The computing apparatus of claim 1, wherein a responsible parent actor includes a process that created or changed a scheduled task.

15. A computing security system, comprising:
a computing endpoint, comprising a hardware platform having a processor circuit and a memory, and operational software to execute on the hardware platform;
a security agent, comprising instructions encoded within the memory to instruct the processor circuit, and configured to protect the operational software, including tracing, for a plurality of events having different direct parent processes, a common responsible parent actor for the plurality of events, and generating a report in which the plurality of events are grouped by the common responsible parent actor, wherein the common responsible parent actor is a source of persistency that operates on a trusted process, wherein the trusted process is not inherently maliciously and can be used maliciously by the source of persistency; and
a system analyzer configured to analyze the report, infer a malicious intent of the common responsible parent actor, and according to the inferred malicious intent, provide a remediation to the computing endpoint.

16. The computing security system of claim 15, wherein the system analyzer is configured to be augmented by human input or feedback.

17. The computing security system of claim 15, wherein the system analyzer comprises a machine learning or artificial intelligence system.

18. The computing security system of claim 17, wherein the system analyzer is configured to receive a pre-trained model.

19. One or more tangible, non-transitory computer-readable storage media having stored thereon executable instructions to:
enumerate on a computing system a plurality of events and targets for the events;
trace, for the events, common responsible parent actors that directed or caused the events, the common responsible parent actors being different from direct actors that directly performed the events, and comprising sources of persistency that operate on trusted objects, wherein the trusted objects are not inherently malicious;
compile an action report wherein events are grouped by their common responsible parent actors;
derive from the action report a remedial security action to remedy a responsible parent actor; and
execute the remedial security action.

20. The one or more tangible, non-transitory computer-readable storage media of claim 19, wherein the action report further associates the plurality of events with their direct parent actors.

* * * * *